(12) United States Patent
Wells

(10) Patent No.: US 6,250,409 B1
(45) Date of Patent: Jun. 26, 2001

(54) MULTI-POINT MOBILITY DEVICE

(76) Inventor: Glenn D. Wells, 8429 N. Anderson Rd., Newton, KS (US) 67114

(*) Notice: Subject to any disclaimer, the term of this patent is extended or adjusted under 35 U.S.C. 154(b) by 0 days.

(21) Appl. No.: 09/388,005

(22) Filed: Sep. 1, 1999

(51) Int. Cl.$^7$ .................................................. B62D 55/104
(52) U.S. Cl. ........................ 180/9.52; 180/6.5; 180/6.54
(58) Field of Search ................................... 180/9.5, 9.52, 180/9.1, 9.32, 9.34, 9.36, 6.48, 6.5, 6.54, 907

(56) References Cited

U.S. PATENT DOCUMENTS

| | | | |
|---|---|---|---|
| 1,336,133 | * | 4/1920 | Christie . |
| 1,894,619 | * | 1/1933 | Knickerbocker . |
| 3,744,857 | * | 7/1973 | Schoonover .......................... 305/145 |
| 4,077,483 | * | 3/1978 | Randolph .............................. 180/6.5 |
| 4,564,080 | * | 1/1986 | Pagett .................................... 180/8.2 |
| 5,577,567 | * | 11/1996 | Johnson et al. ...................... 180/9.23 |

* cited by examiner

*Primary Examiner*—Kevin Hurley
(74) *Attorney, Agent, or Firm*—Bradley P. Sylvester

(57) ABSTRACT

A multi-point mobility device that is capable of navigating over rough terrain without difficulty, including snow, say and, and, and mud, and which is able to reconfigure the two belt track assemblies so as to minimize lateral friction by the belts with indoor floor surfaces or carpets.

A separate rear wheel, located behind the side mounted track assemblies is able to be lowered when desired, so as to raise the rear portion of the multi-point mobility device off of the ground surface. In addition, the central wheel of the track assembly is also able to be raised or lowered, giving for possible track belt configurations including the normal track configuration, a second track configuration in which the front portion of the track is raised off of the ground surface, a third track configuration in which the rear wheel is lowered, along with the central wheel, to provide a three-point contact with the ground surface, and a fourth configuration in which the rear wheel is lowered raising a standard track configuration so that they three-point contact is achieved with the ground surface, providing turning ability at the extreme front-end of the device.

19 Claims, 22 Drawing Sheets

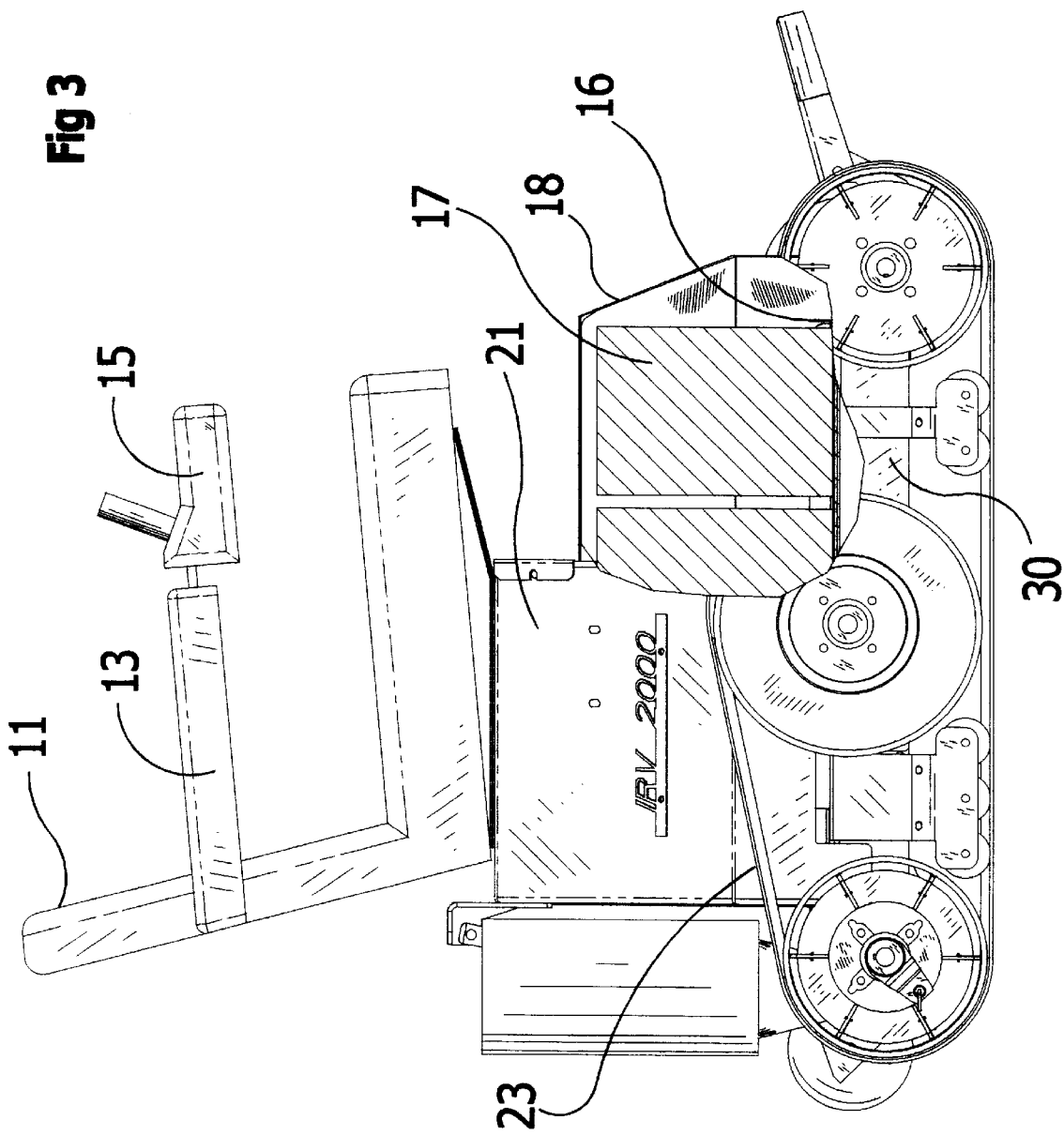

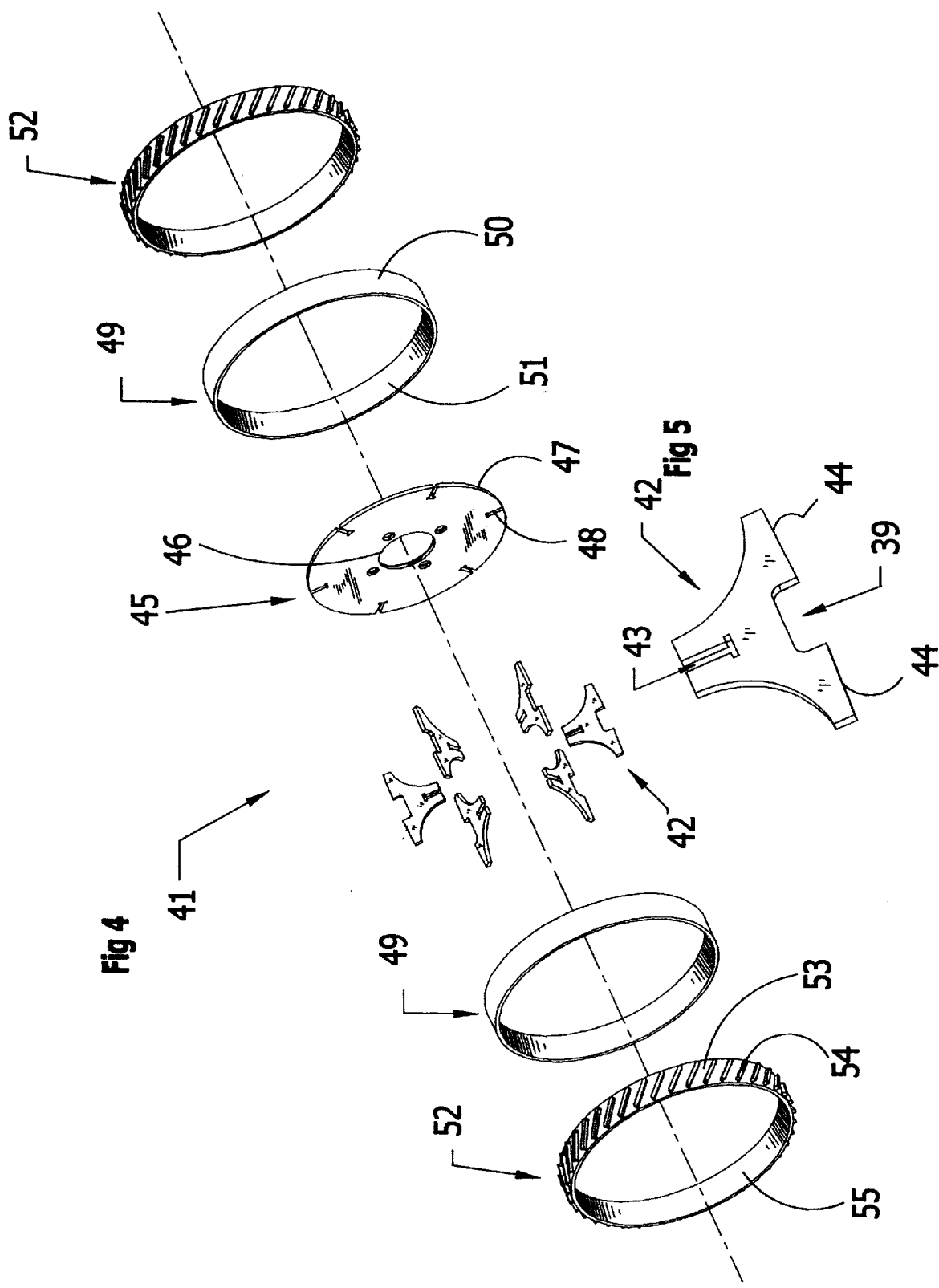

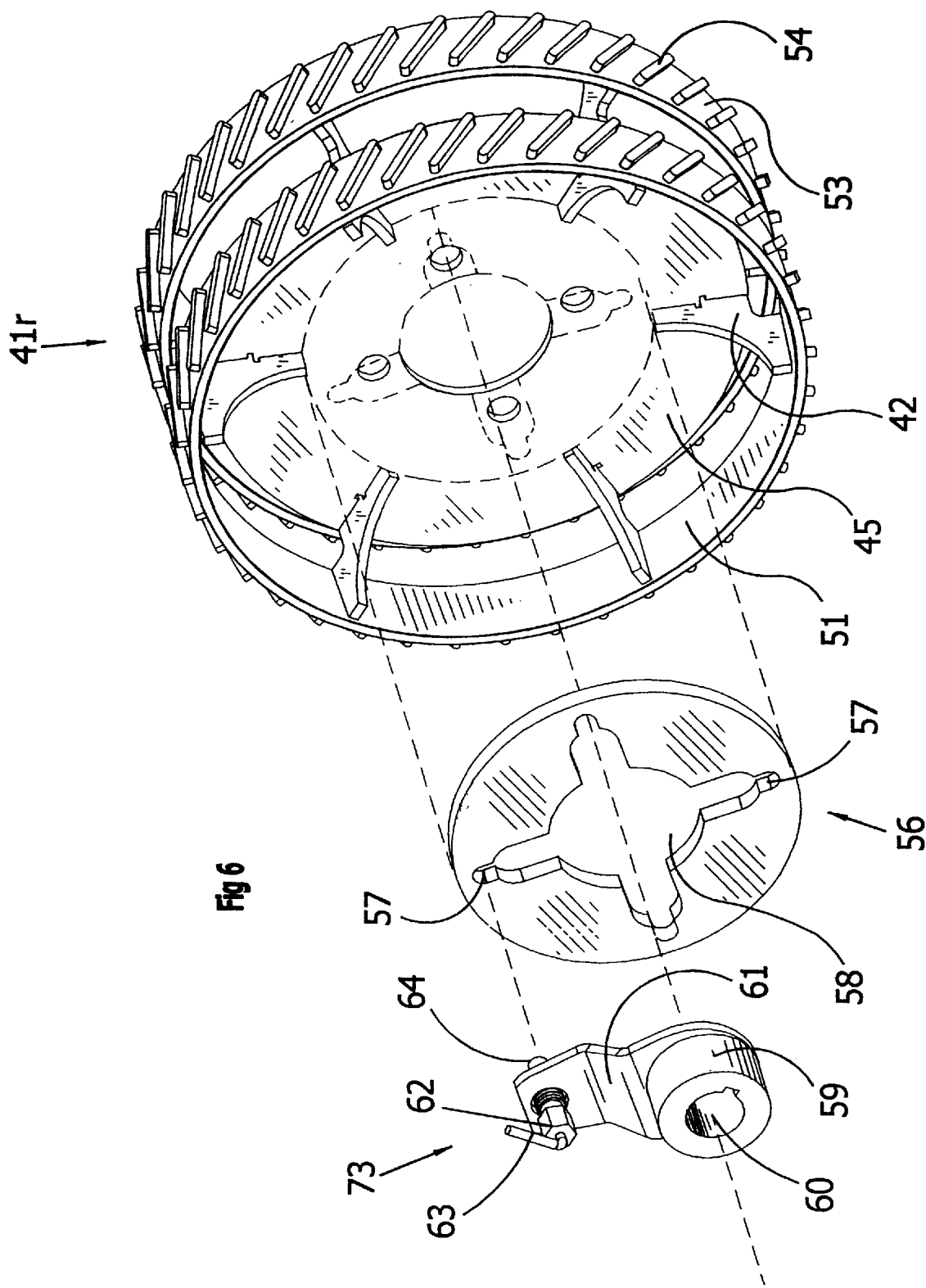

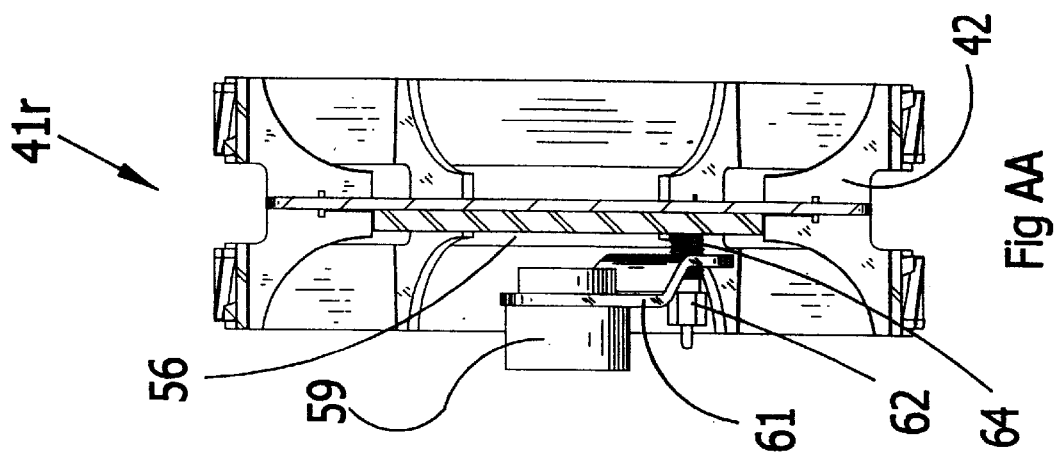
Fig AA
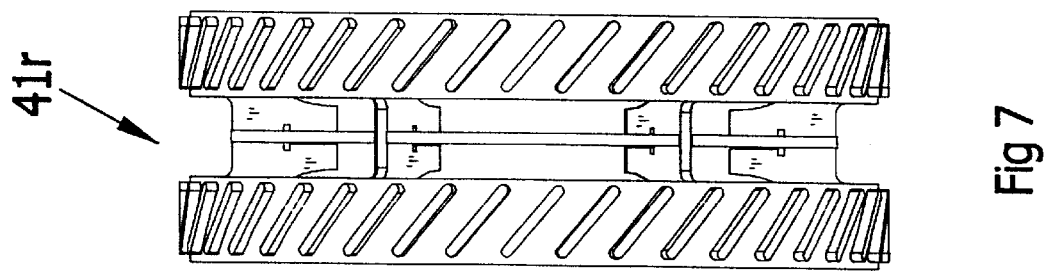
Fig 7
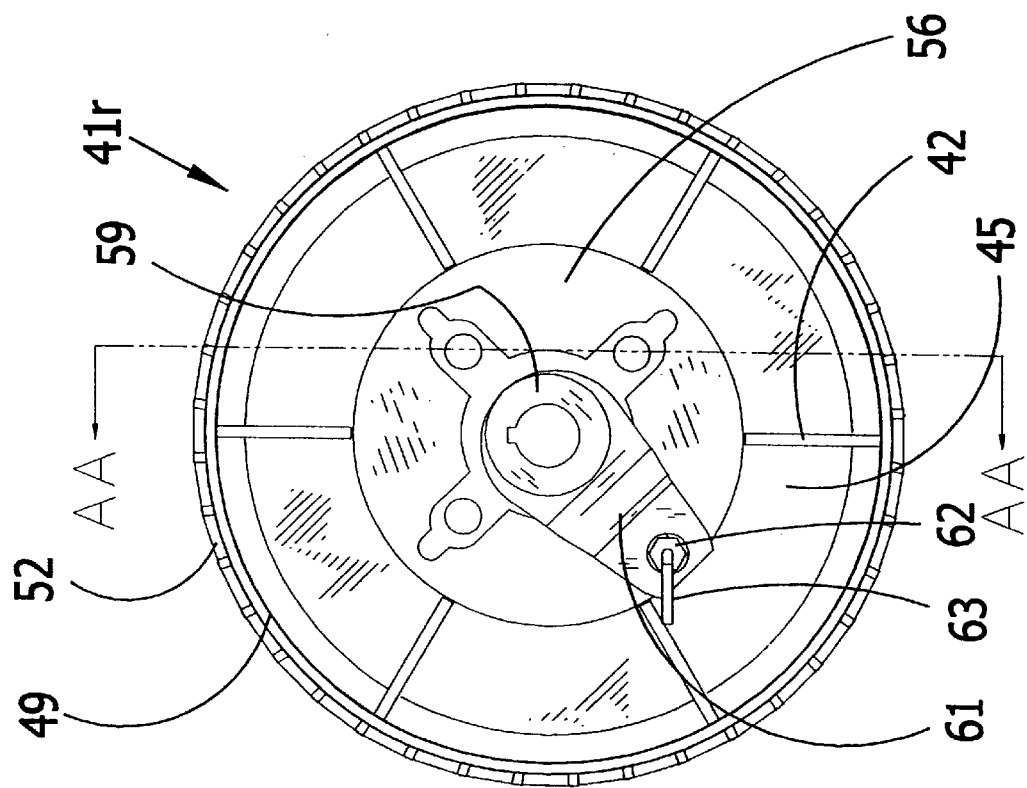
Fig 8

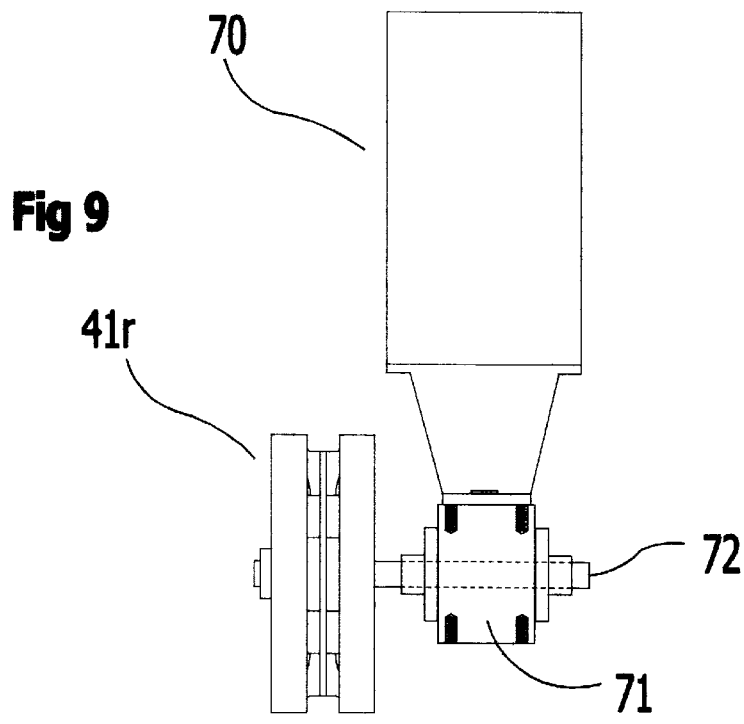
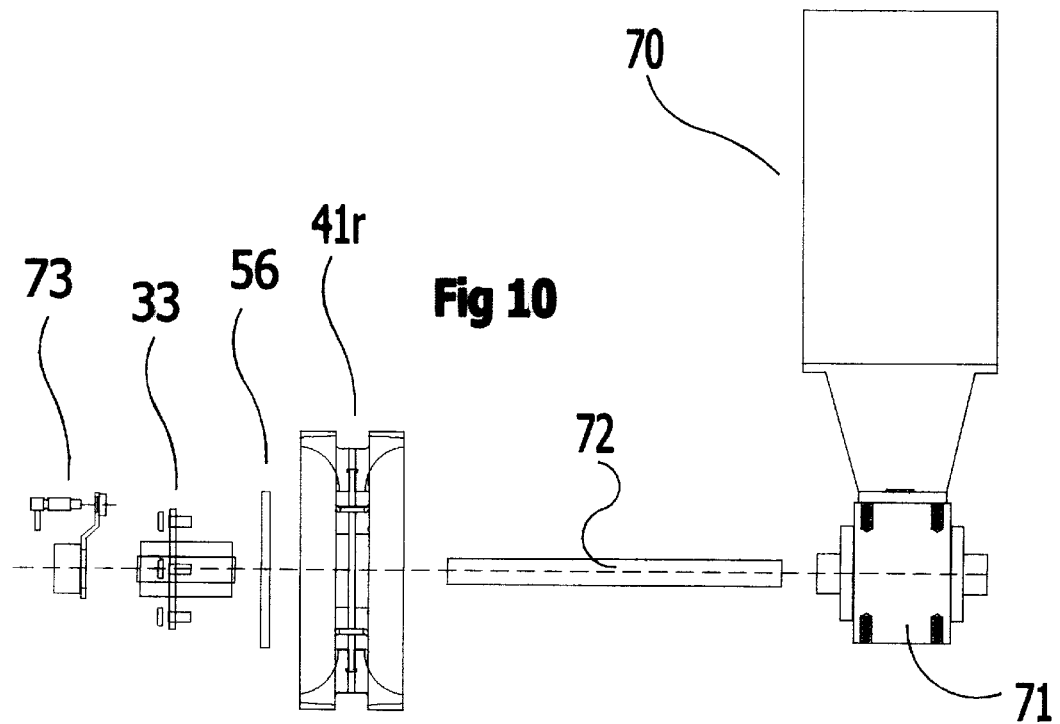

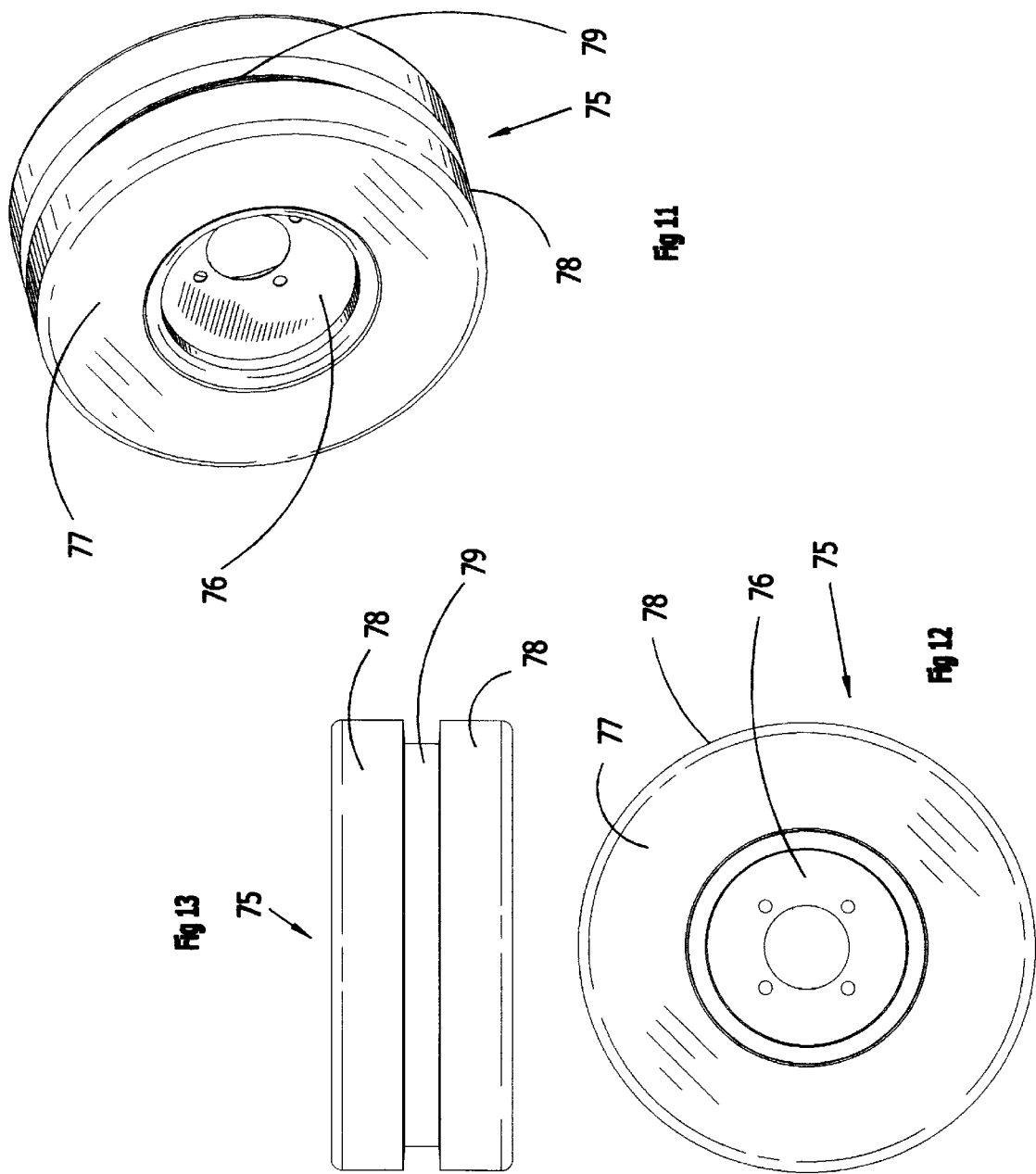

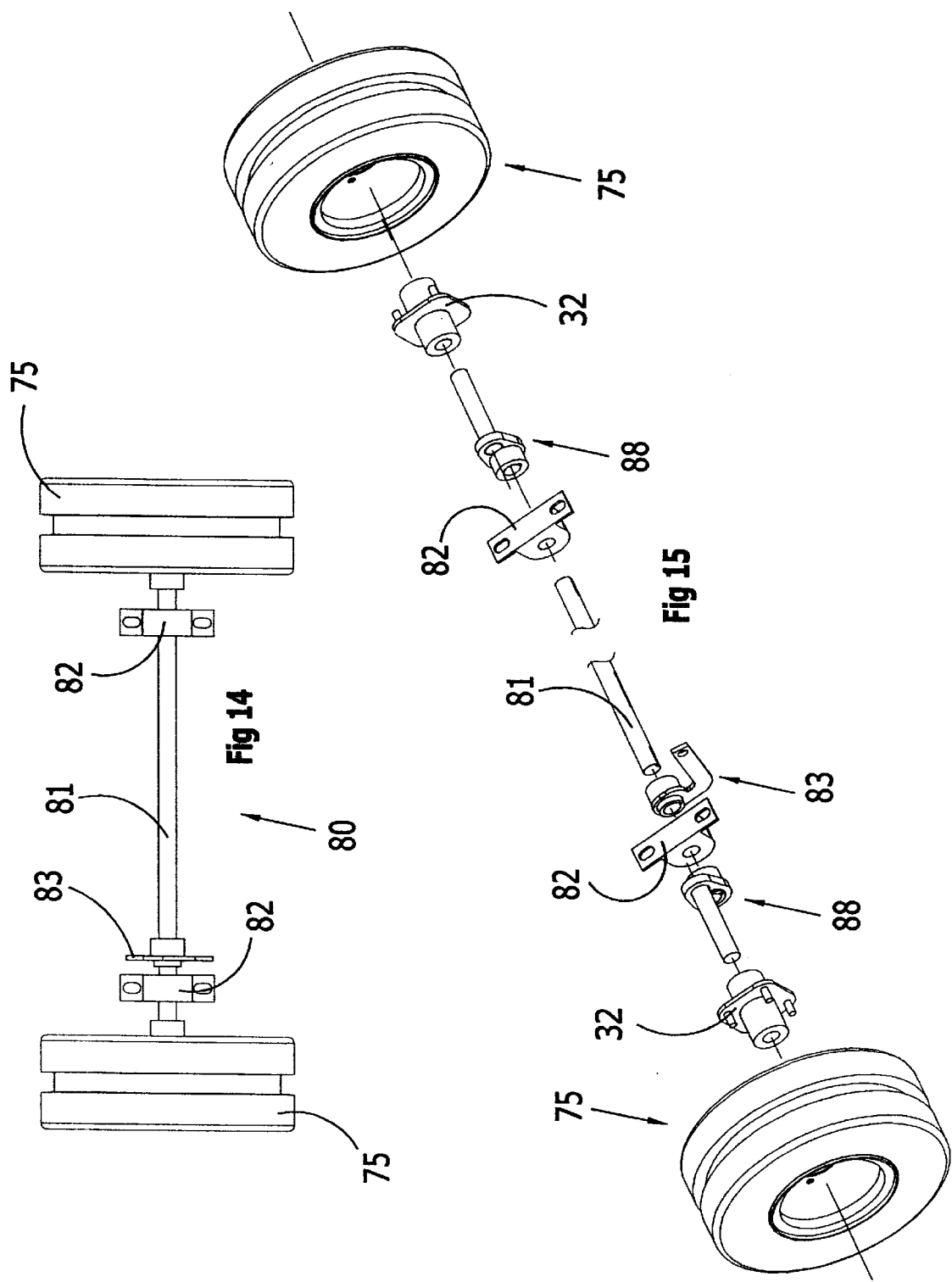

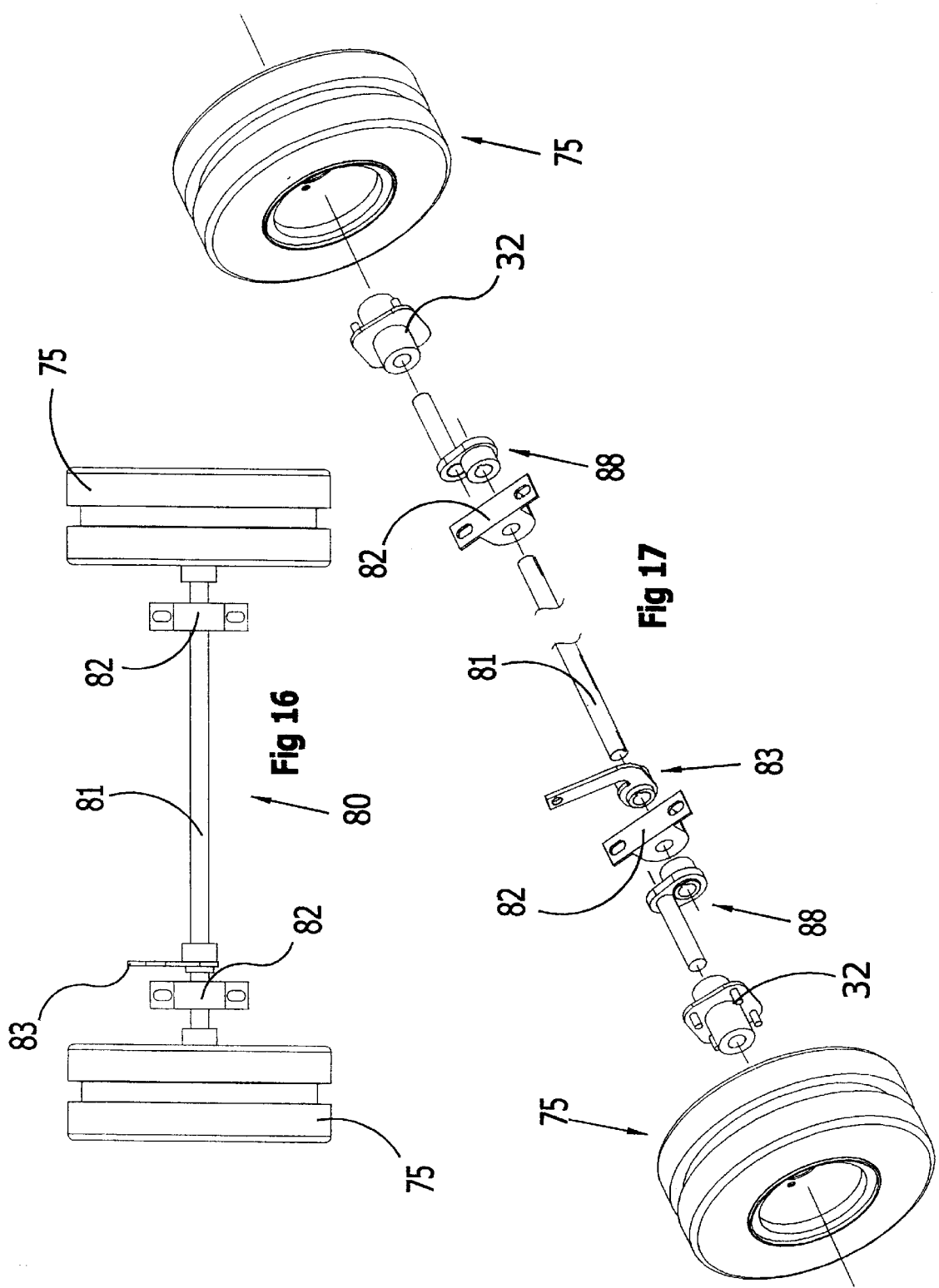

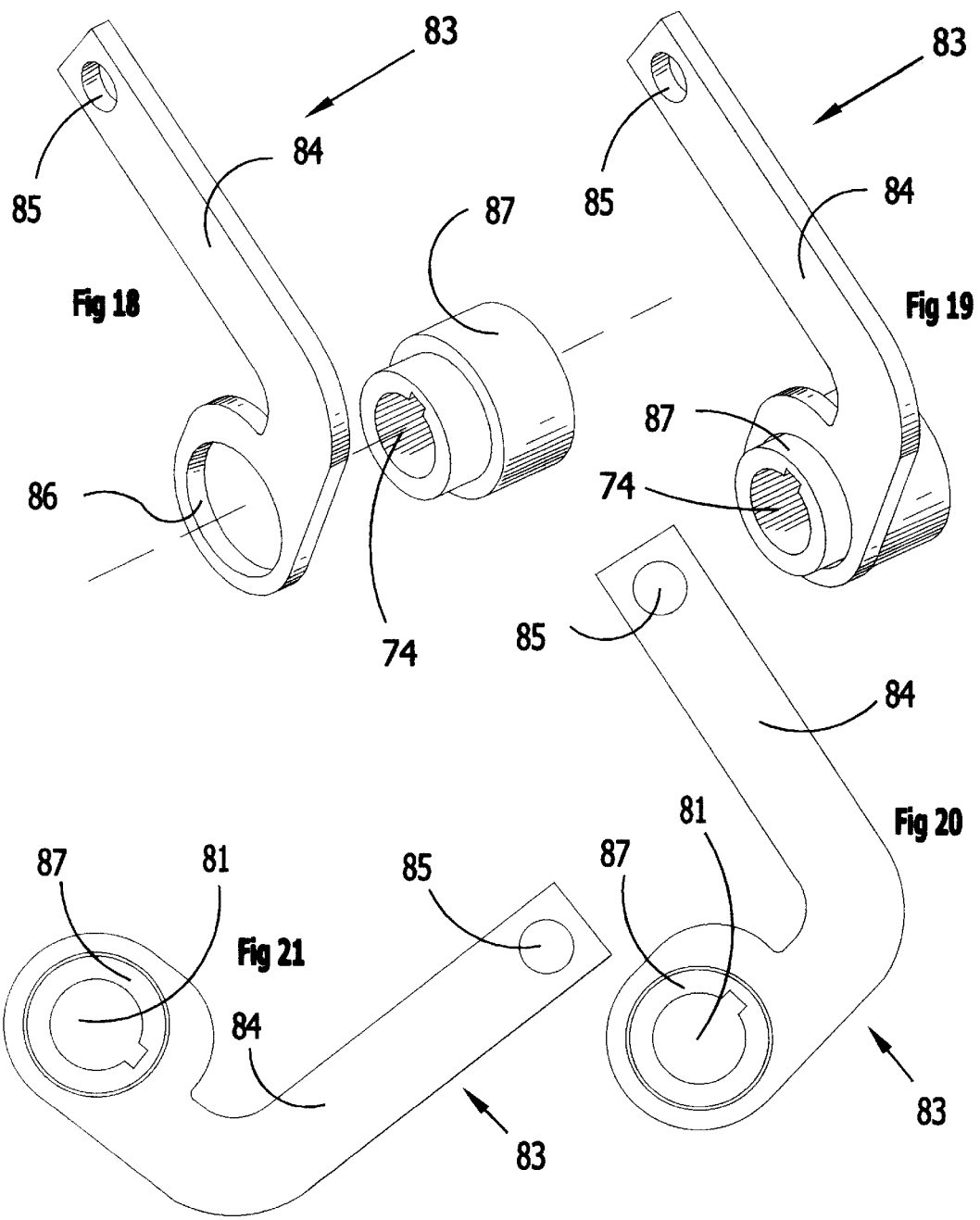

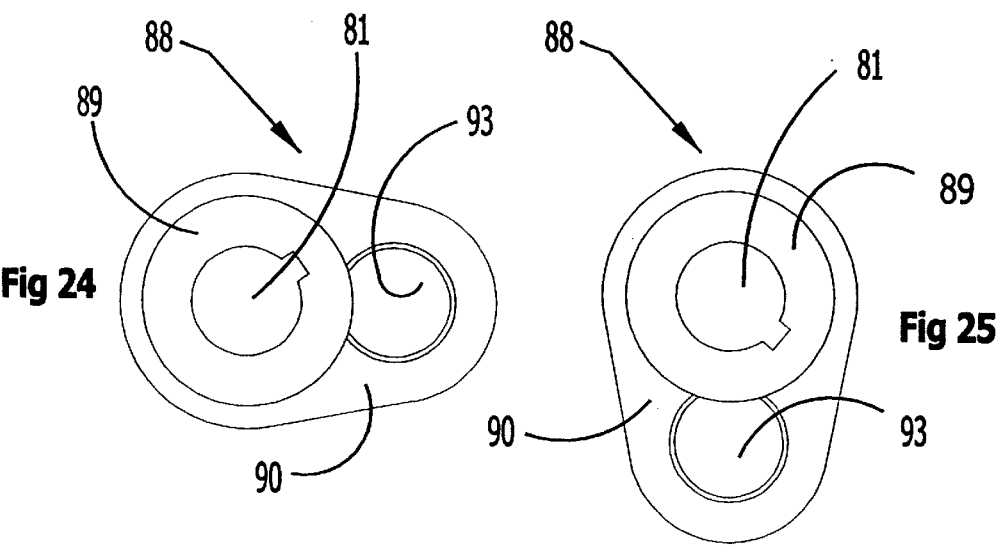
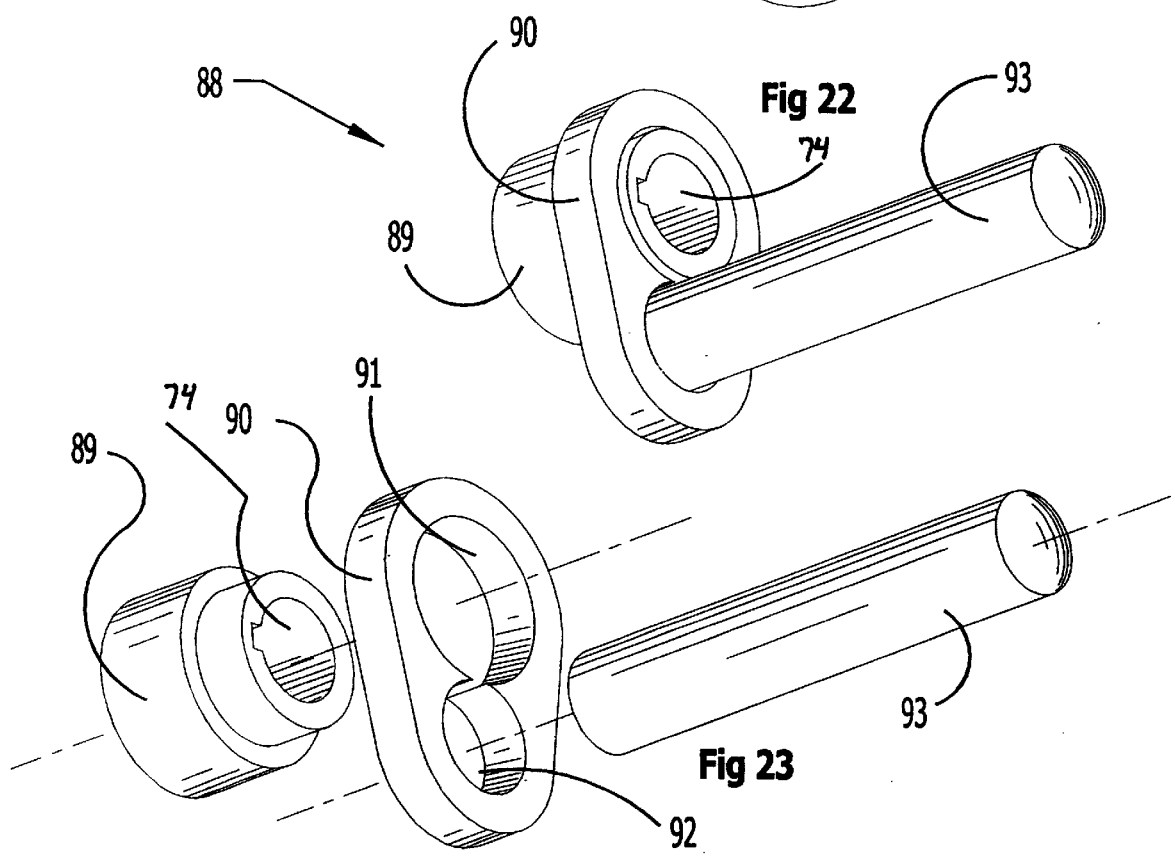

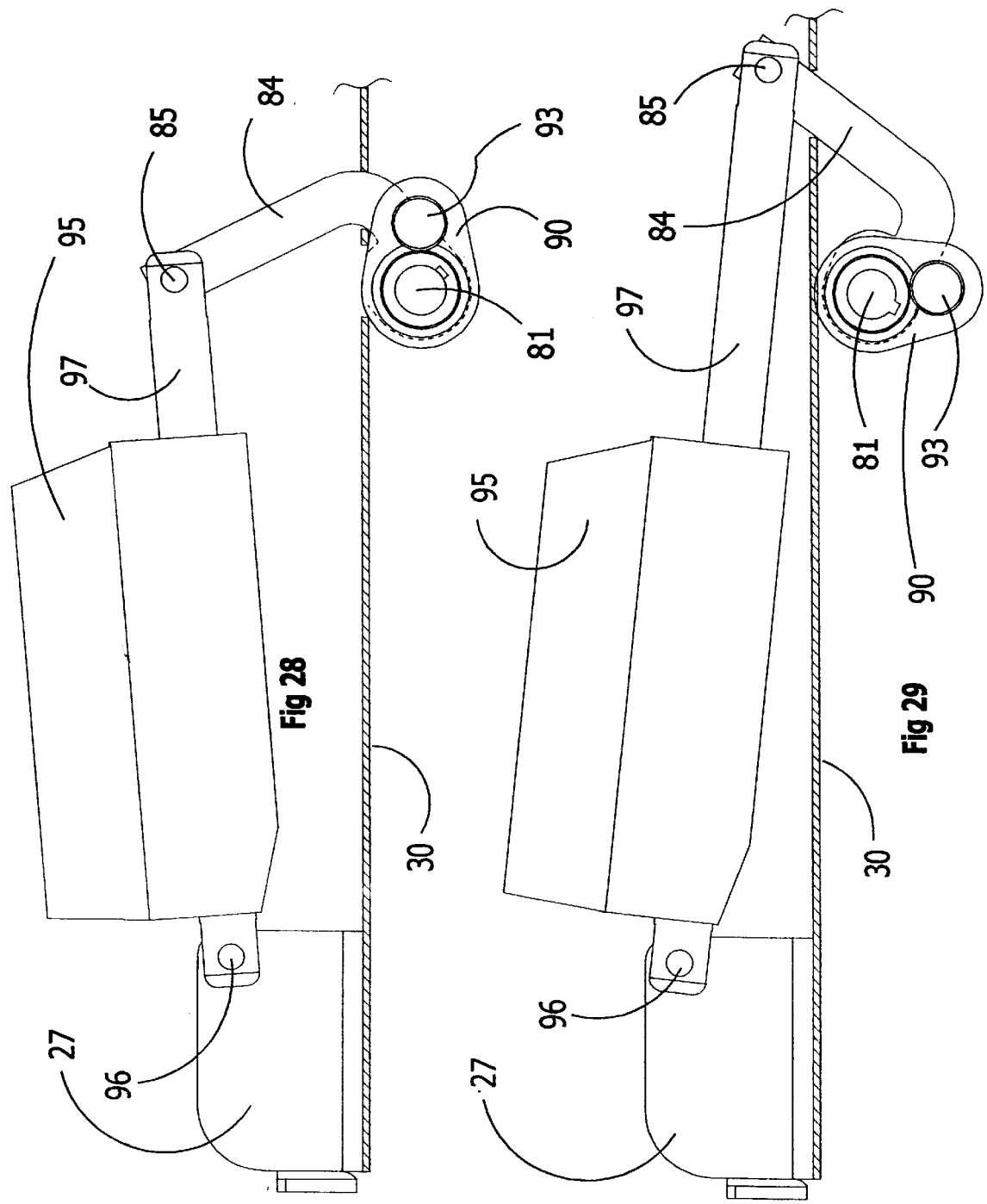

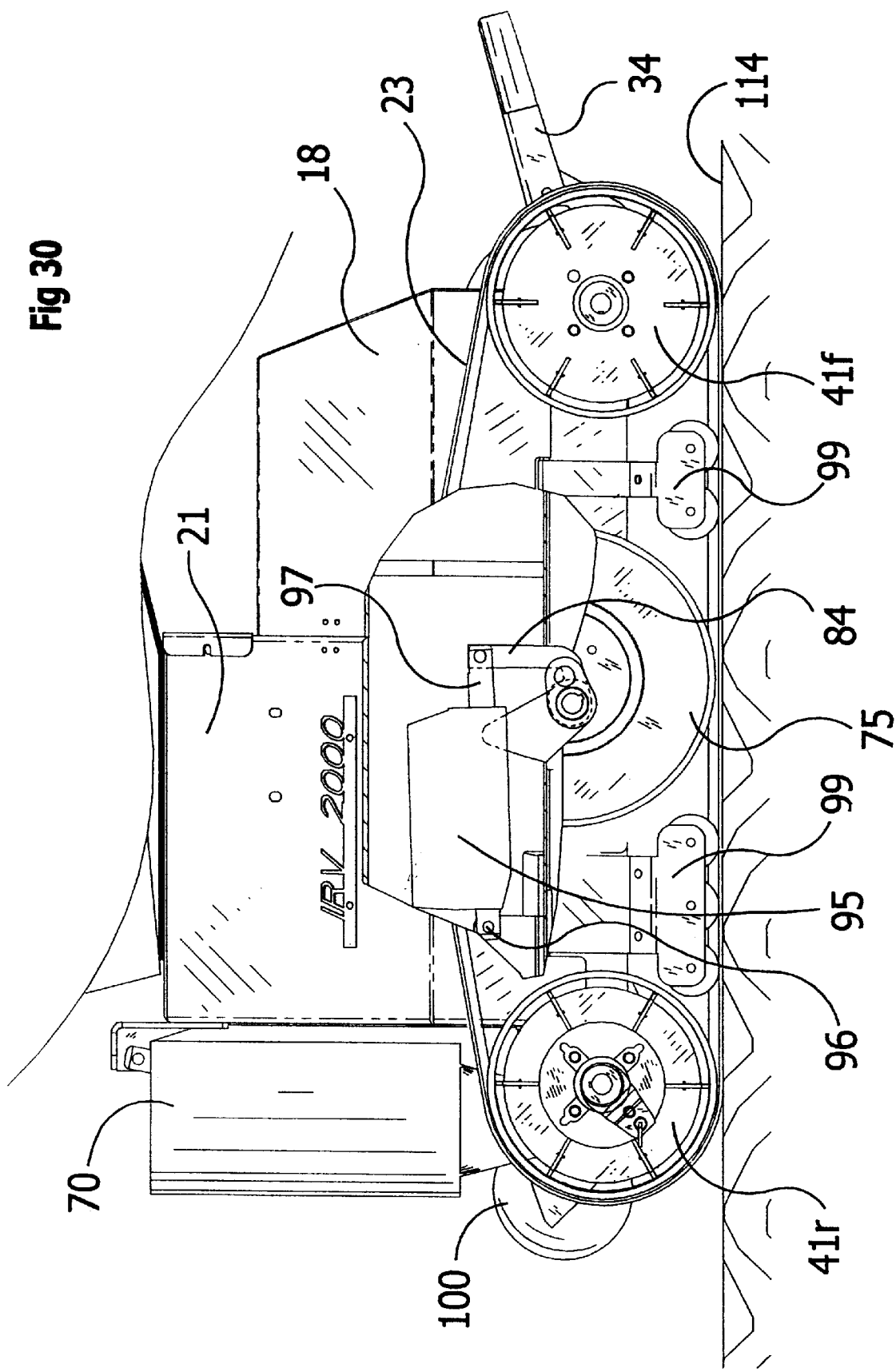

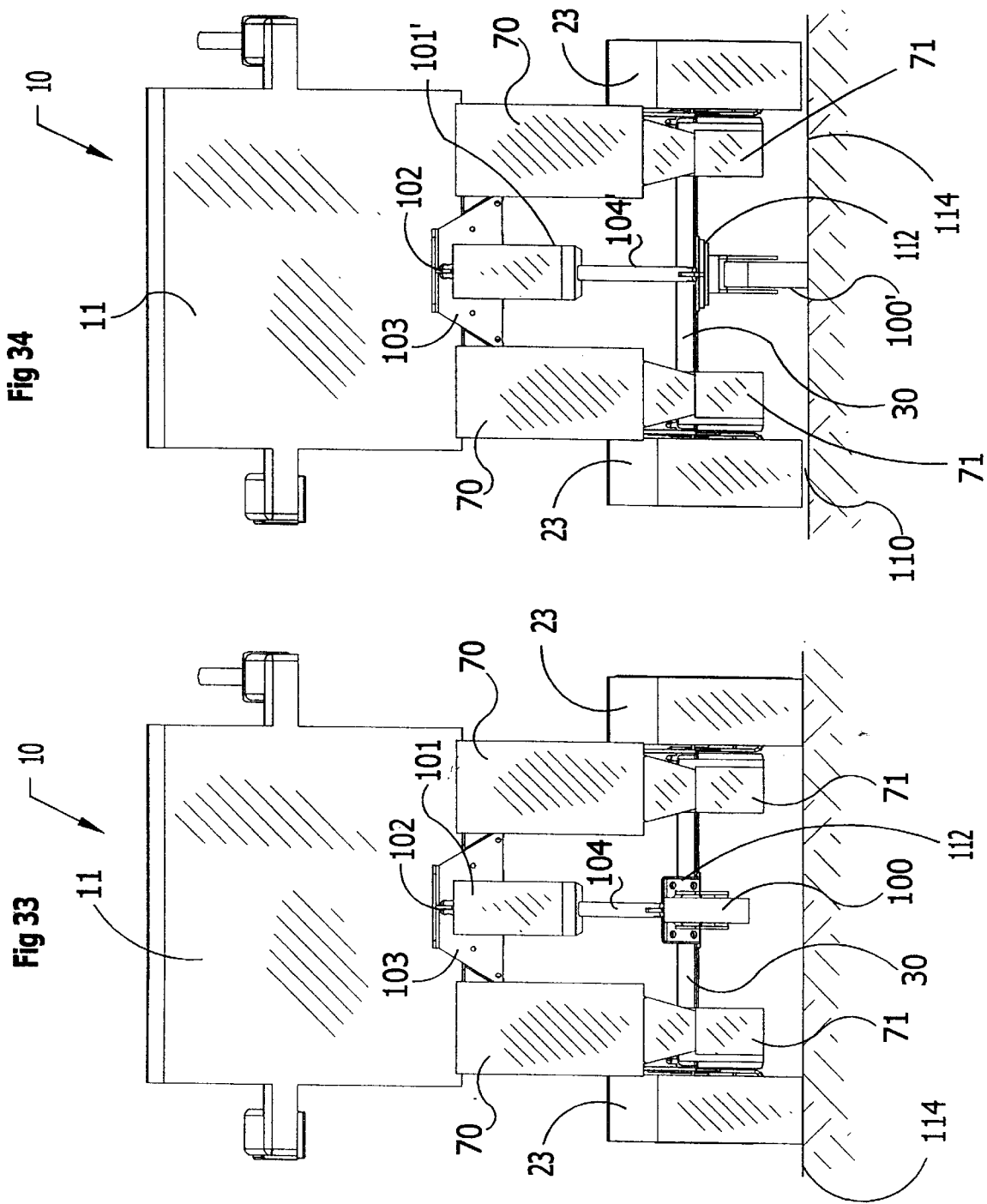

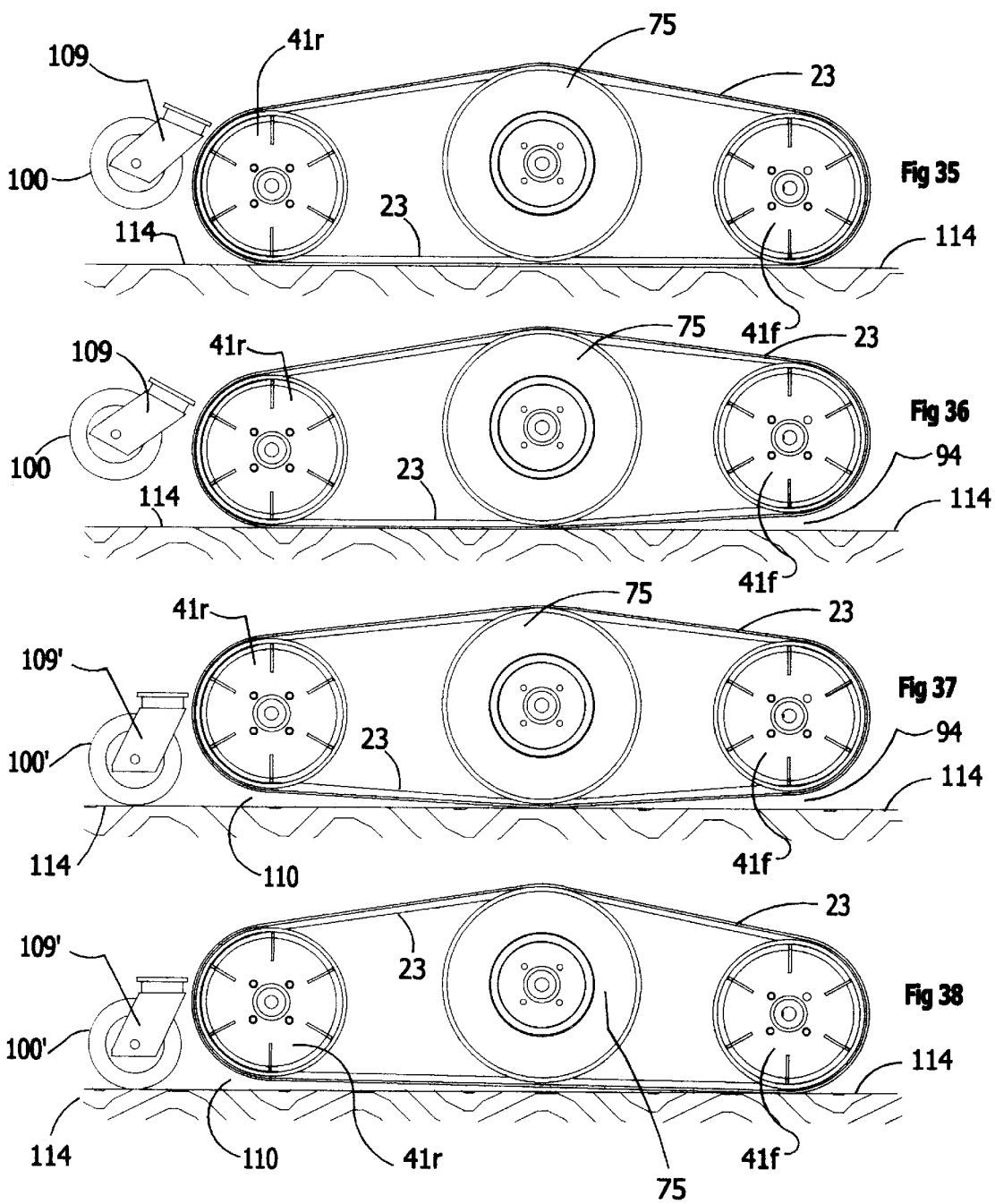

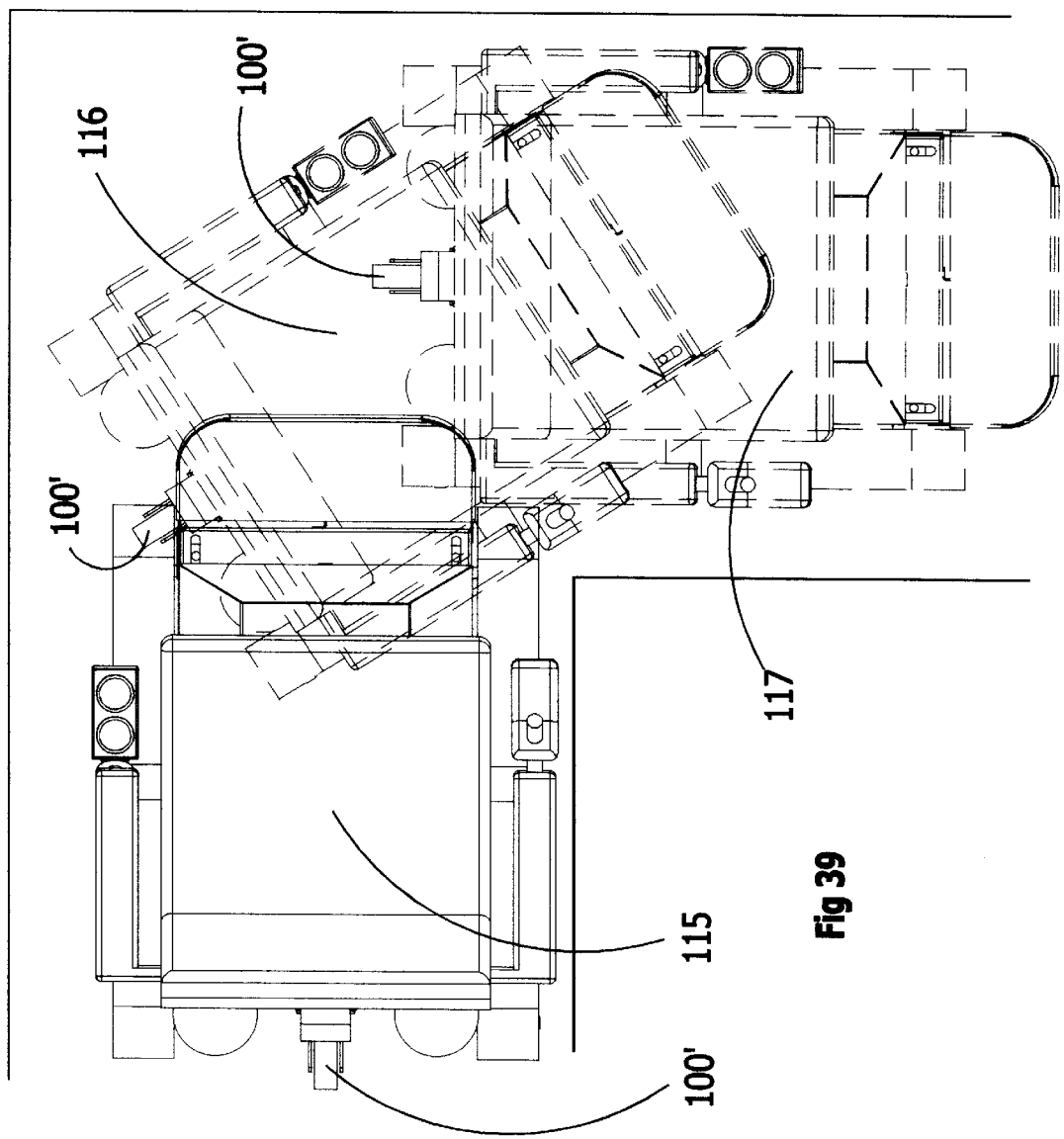

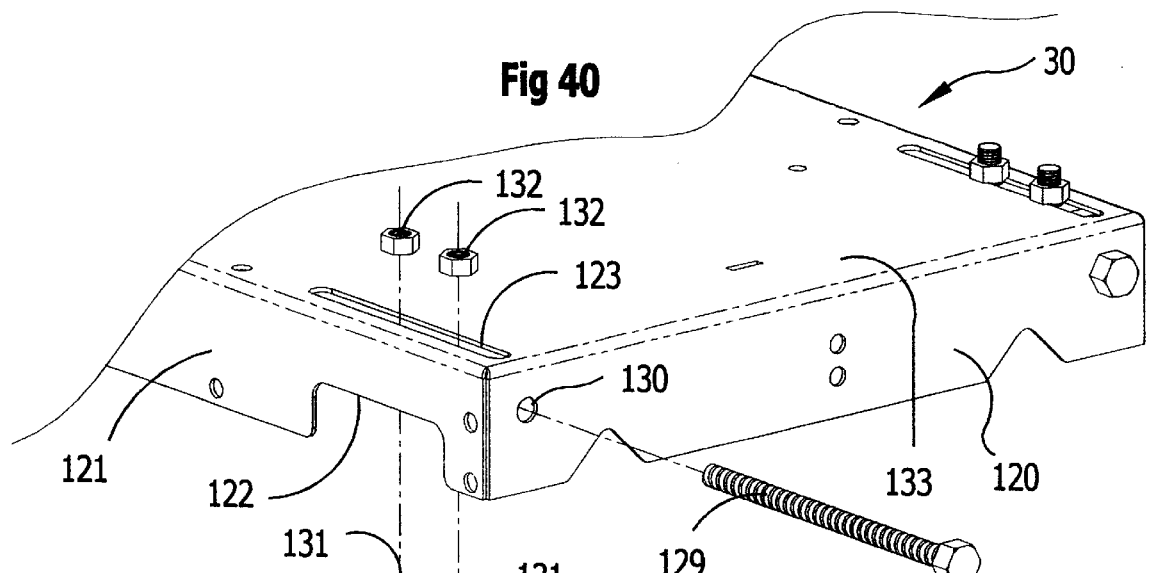
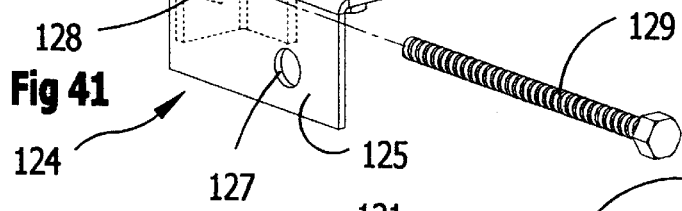
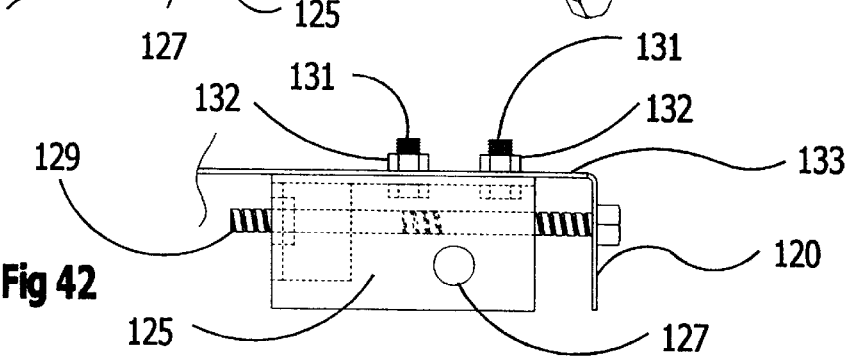

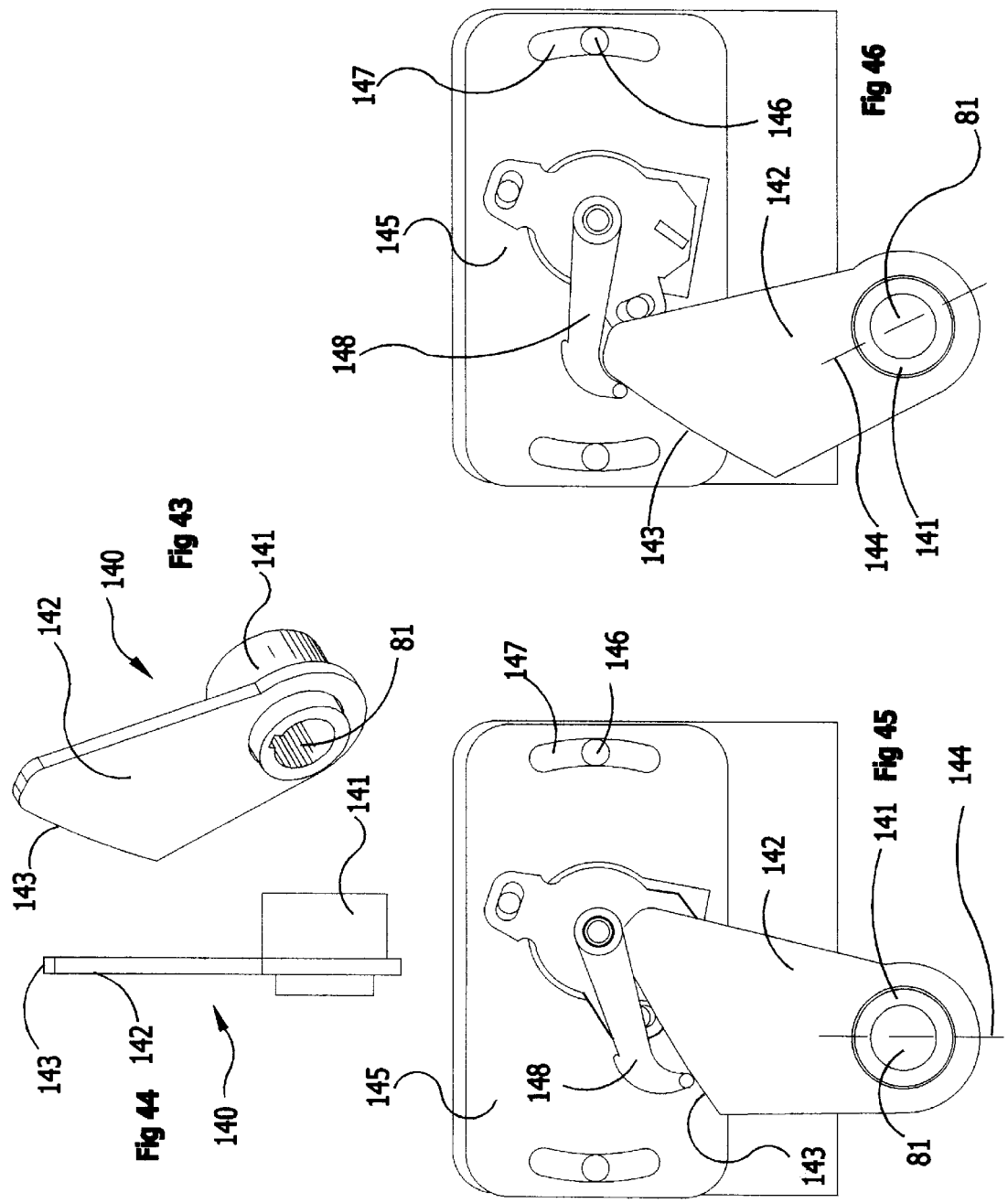

MULTI-POINT MOBILITY DEVICE

BACKGROUND OF THE INVENTION

This invention is intended to alleviate some of problems that are inherent in apparatus used to provide mobility for disabled persons. However, this device would be useful in many situations where transport is desired over rough terrain. This device is useful in the transportation of both persons and/or items across rough or smooth terrain, both outdoors and in an indoor situation. An analogous tool used by disabled or handicapped persons is a wheelchair, while an analogous load carrying device is commonly known as a skid-steer loader. Both items transport items and persons, yet neither one is able to be integrated fully in both an outdoor and an indoor setting.

While wheelchairs are the common form of transportation in areas that are prepared to receive these means of conveyance, areas such as nature trails, gravel paths, and crossings having excessive mud or water, generally prove to be insurmountable obstacles for the average wheelchair. In these more primitive conditions, wheels tend to find surface imperfections, such as rocks, to be barriers that are not readily rolled over. In situations where mud, sand, or snow are present, wheels will often sink into the mud, sand, or snow, causing the wheelchair to become mired and easily stuck.

The use of belts, placed over a series of wheels, in the form of a track assembly, will usually be able to traverse over the primitive areas that would generally restrict movement of a typical wheelchair. The multi-use capability of a belted track assembly is readily apparent in construction equipment as well as military vehicles. Small vehicles, such as a typical skid-steer loaders have significant mobility, through the use of controlling the speed and/or the direction of movement for each of the tracks.

While belted track assemblies provide significant advantages over wheels in rough terrain situations, such a means of conveyance prove utterly destructive to typical household surfaces, such as carpeting and many types of household flooring. The reason for this is that the surface of the track can only go forwards and backwards, which results in significant lateral friction during turning exercises. This causes scraping of smooth flooring, and virtual shredding of many types of carpets.

SUMMARY OF THE INVENTION

This invention provides a frame that supports a seat for the user, as well as the power and drive sources for the invention. This multi-point mobility device is generally electrically powered, finding the source of electrical energy in stored batteries positioned on the frame.

Movement of the multi-point mobility device is accomplished through a set of track assemblies located on each side of the frame, which generally comprise a belt fitted over a rear drive wheel, a larger center wheel, and a front wheel. The front wheel and rear drive wheel are fixed to the frame, accepting some minor adjustments horizontal to the frame and each other, so as to provide the proper amount of tension to the belt.

Each set of track assemblies are independently powered, and controlled by the user/operator of this invention. The center wheel of the track assembly has the capability of being raised or lowered, with respect to the front wheel and rear drive wheel. When the center wheel is raised to its upward position, all three wheels of each track assembly will cause the belt to concurrently contact a flat ground surface. When the center wheel is lowered, the rear drive wheel and front wheel do not present the belt to the ground surface in a straight line with the center wheel. When the center wheel is lowered, only one other wheel at a time in the track assembly is capable of concurrently causing the belt to contact a flat surface the device is resting on.

A rear wheel, independent of either track assembly, is provided at the central rear-most portion of this invention. The rear wheel is capable of being raised off of the ground, or lowered to the ground by an actuating cylinder, to the point where it causes the back end of the device to be raised up off of the ground surface. When the rear wheel is raised off of the ground, the track assemblies will contact the ground according to the position of the center wheel, and the distribution of weight either forward or aft of the track assembly's center wheel when it is in the lowered position.

Using the rear wheel in conjunction with the up and down configuration for the center wheel, provides four basic track configurations, with each track configuration offering its own independent capability over various terrain and turning conditions.

The first configuration is the typical wheel track configuration, where the rear wheel is raised, along with the center wheel. In this configuration, the full-length of the bottom portion of the track will present itself to the ground surface in a linear fashion. This is the configuration typical with most prior track belt assemblies.

The second configuration of the track assembly is where the center wheel is lowered, with the rear wheel remaining in a raised position, with the greater weight distributed behind or aft of the center wheel. This causes that portion of the track in front of the center wheel to be raised off of the ground surface at an angle. One obvious advantage to this configuration is the lessening of the impact and tendency to bog down a track configuration in heavy snow or muddy conditions, as the front part of the track is always presented to the ground surface in an angled climbing position.

The third configuration of track assembly is when the center wheel is lowered, along with the rear wheel. In this configuration, the point of contact with the ground are made by the rear wheel, and by the portion of the track in contiguous contact with the bottom of the track assembly's center wheel. This is a three-point contact with the ground surface, and provides a minimum of contact by the track with the ground surface. This configuration is most useful in a home situation, presenting minimal belt surface against the floor or carpet, which in turn limits the lateral friction area of the belt against the floor or carpet during turning.

The fourth configuration is where the center wheel is raised, so as to provide a straight linear configuration for that portion of the belts adjacent to the ground surface. The rear wheel is urged downward below the horizontal plane of the track on the ground surface, so that the rear wheel causes the back or entire rear portion of the multi-point mobility device frame to be raised upward, in comparison to the front of said device frame. This has the effect of causing the rear portion of the track assemblies to be lifted off of the ground surface, so that the points of contact with the ground surface comprise the rear wheel and front portion of said track assemblies.

This fourth configuration supplies a track configuration which has minimal contact with ground surface, and which in effect pulls the invention around corners. This configuration along with the third configuration described above, provide optimal turning abilities within confined areas, utilizing minimal track contact with floor or ground surfaces.

Further optimization of this invention is realized through the use of sensors and display means, which can indicate to the user the basic track configurations, and the extent to which they are positioned.

This invention is further supplied with a means to engage and disengage the electric drive motors. When so disengaged, the track assemblies can move freely, so that this apparatus can function in a manner similar to the typical wheelchair. This is especially true with the third configuration of the track assemblies described above.

The track assembly belts are able to maintain the stable tension level necessary, through the adjustment of the front wheel in relation to the rear wheel. The center wheel, although larger than either of the other two wheels, does not cause a change in belt tension when moved upward or downward within the parameters established by the invention, since the center wheel is able to constantly contact the track belt even at the limit of its prescribed upward and downward movement.

It is the object of this invention to provide means of transport that is able to both accommodate typical natural rough terrain, and yet be able to maneuver in a typical home situation, without causing damage to flooring surfaces.

It is a further object of this invention to provide a maximum set of ground contact options available with a belted track, so as to provide various and optimal choices for maneuver indoors and outdoors.

It is a further object of this invention provide an apparatus that is capable of functioning as a belted track transporting apparatus, for use in primitive conditions, while at the same time providing characteristics similar to a common wheelchair for less primitive conditions, which do not damage interior flooring surfaces.

BRIEF DESCRIPTION OF THE DRAWINGS

FIG. 3 is a side view of the invention, showing placement of the batteries in relation to the other components of the invention.

FIG. 4 is an exploded view of components which comprise the wheel for the front wheel and rear drive wheel.

FIG. 5 is an enlarged perspective view of the mounting ears shown in FIG. 4.

FIG. 6 is an exploded view of the rear wheel and drive disc/bushing assembly.

FIG. 7 is a top view of the assembled wheel shown in FIG. 4.

FIG. 8 is a side view of the rear drive wheel, showing a cross sectional view for FIG. AA.

FIG. AA is a cross-sectional view of the rear drive wheel, showing the bushing, drive arm and plunger assembly.

FIG. 9 is a back view of the drive motor, gear box and rear drive wheel assembly that has been fitted on an axle.

FIG. 10 is an exploded view of FIG. 9, in which the drive engage means, hub, drive disc, and wheel are shown in the order in which they are placed on the axle.

FIG. 11 is a perspective view of the center wheel.

FIG. 12 is a side view of the center wheel.

FIG. 13 is a depiction of the top view of the center wheel.

FIG. 14 is a view that depicts a view as seen from below the center wheel and axle assembly, when the center wheel is in an up position.

FIG. 15 is a perspective exploded view of FIG. 14, showing the offset axles to be configuring the center wheels in the up position.

FIG. 16 depicts a view as seen from below the center wheel and axle assembly, where the center wheel is in a down position.

FIG. 17 depicts an exploded view of FIG. 16, where the L-shaped member has caused the offset axle assembly to rotate 90 degrees, from that shown in FIG. 15, so that the center wheel is now in a lowered or down position.

FIG. 18 depicts a perspective exploded view of the L-shaped number and bushing.

FIG. 19 depicts a perspective view of and assembled L-shaped member.

FIG. 20 is a side view of L-shaped member and bushing in an up position.

FIG. 21 depicts the same L-shaped member as shown in FIG. 20, where the L-shaped member has been rotated 90 degrees, so as to place the center wheel in a down position.

FIG. 22 depicts a perspective view of the offset axle assembly that has been rotated to a down position.

FIG. 23 is an exploded view of the offset axle assembly shown in FIG. 22.

FIG. 24 shows a side view of the offset axle assembly in an up position, where the view of said offset axle assembly is from the interior or bushing side of said offset axle assembly.

FIG. 25 shows a side view of the offset axle assembly in a down position, where the view of said offset axle assembly is from the interior or bushing side of said offset axle assembly.

Figure 26:
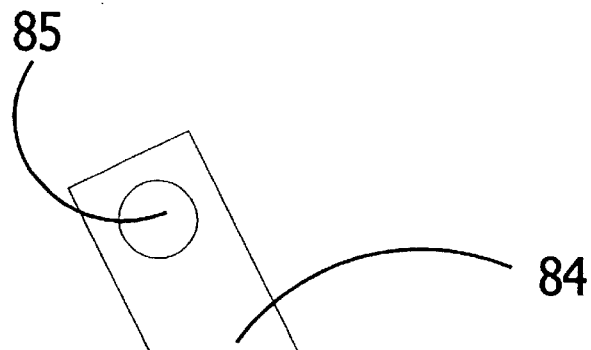

FIG. 26 depicts a side view of the L-shaped member and connected offset axle assembly, as viewed from the offset axle side, also referred to as the wheel side, where the L-shaped member and offset axle are configuring the center wheel to an up position.

Figure 27:
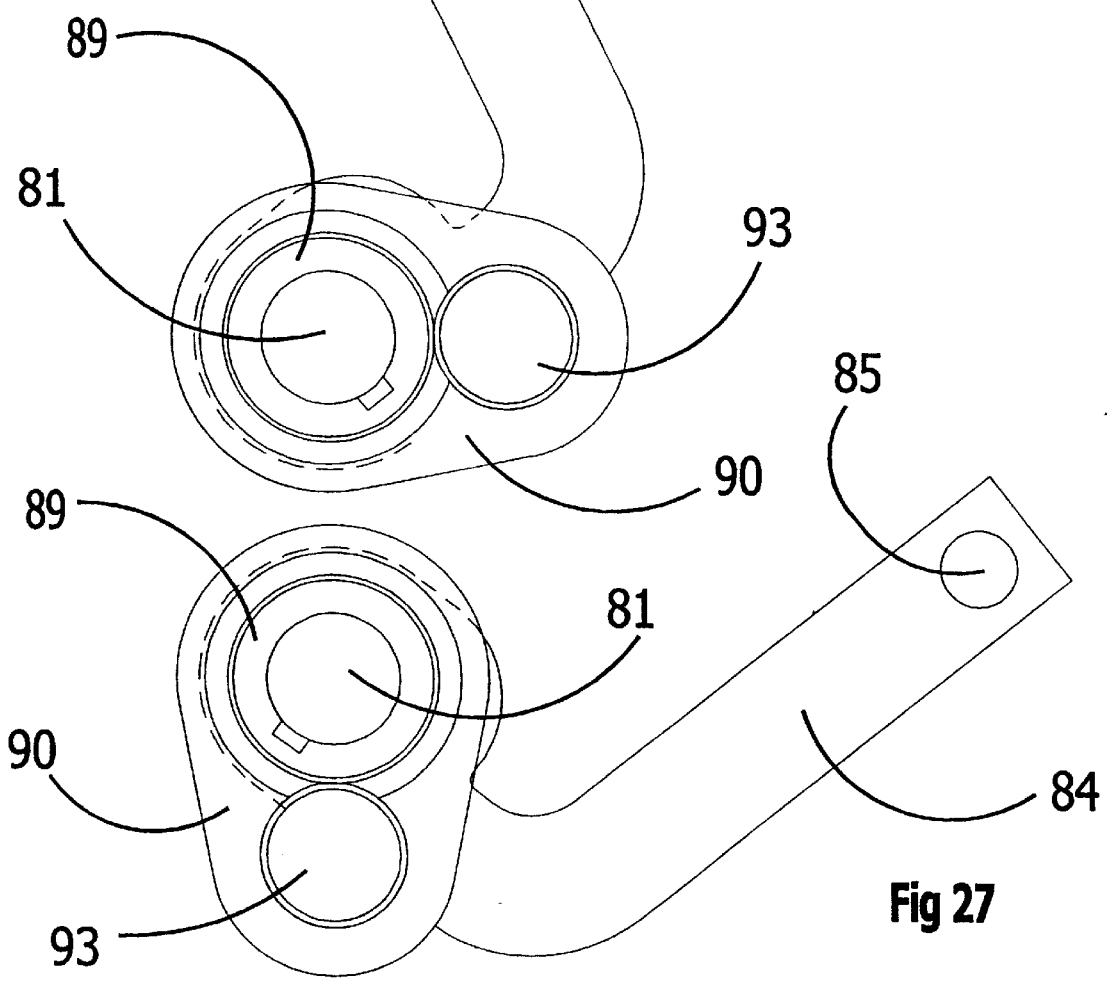

FIG. 27 depicts the same L-shaped member and offset axle assembly as shown in FIG. 26, where said L-shaped member and offset axle assembly have been rotated 90 degrees so that the center wheel is now in the down position.

FIG. 28 depicts a side view of the axle actuator, as connected to the axle actuator mount on one end, and to the L-shaped member on the other end, showing the offset axle which, when so configured, has the center wheel moved into an up position.

FIG. 29 depicts the same view as that shown FIG. 28, with the axle actuator arm extended so that the L-shaped member has rotated about the axle, causing the offset axle to rotate downward to configure the center wheel into a down position.

FIG. 30 is a side view of the multi-point mobility device showing the track assembly and a cut away view of the axle actuator shown in FIG. 28, where the center wheel is in an up position.

Figure 31:
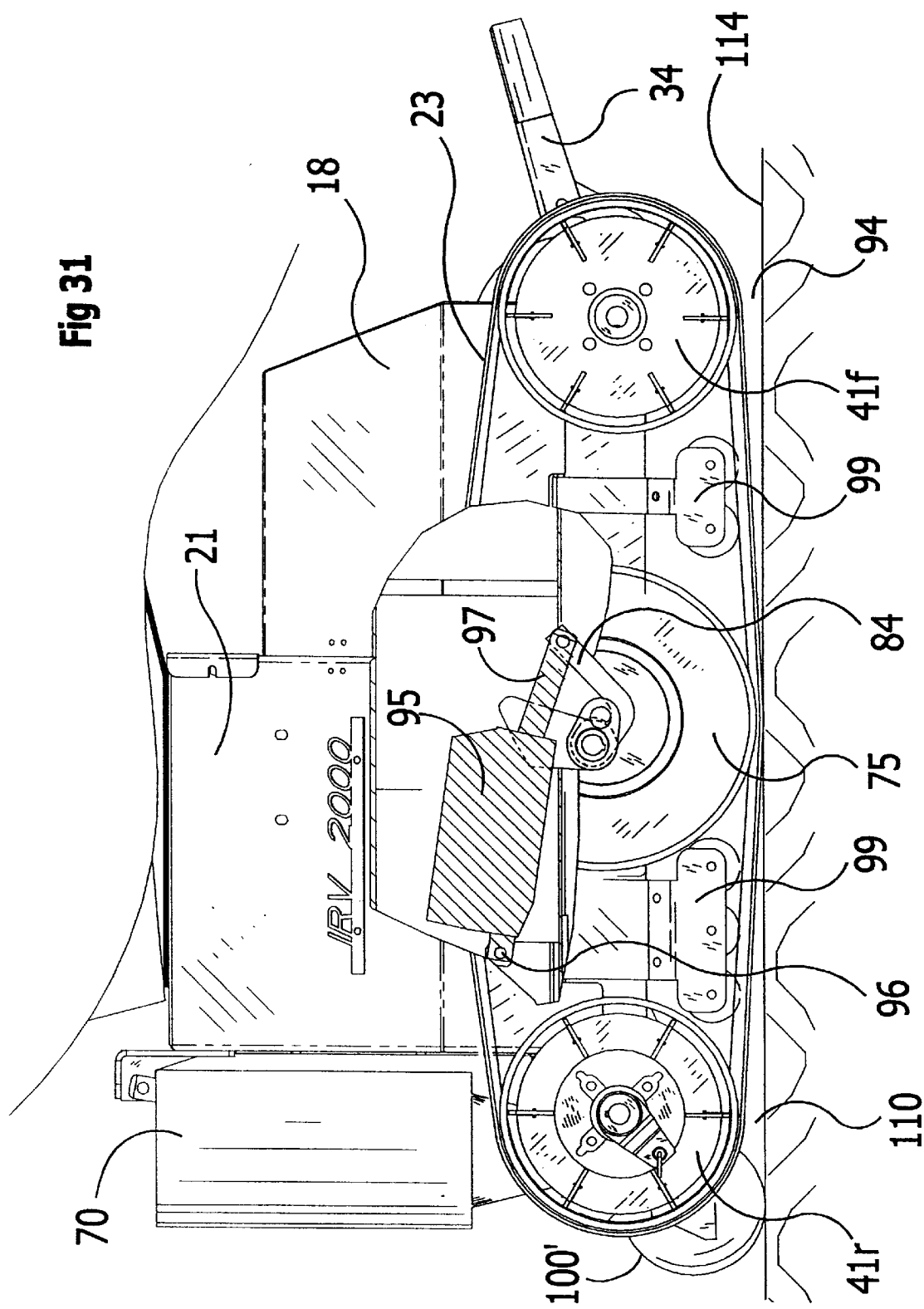

FIG. 31 is a side view of the multi-point mobility device showing the axle actuator arm extended outward so that it has urged the L-shaped member to rotate about the axle, causing the offset axle to move downward so as to configure the center wheel in a down position, which when the rear wheel is also shown in the down position, causes the track on both the rear drive wheel and front wheel to rise off of the flat ground surface.

Figure 32:
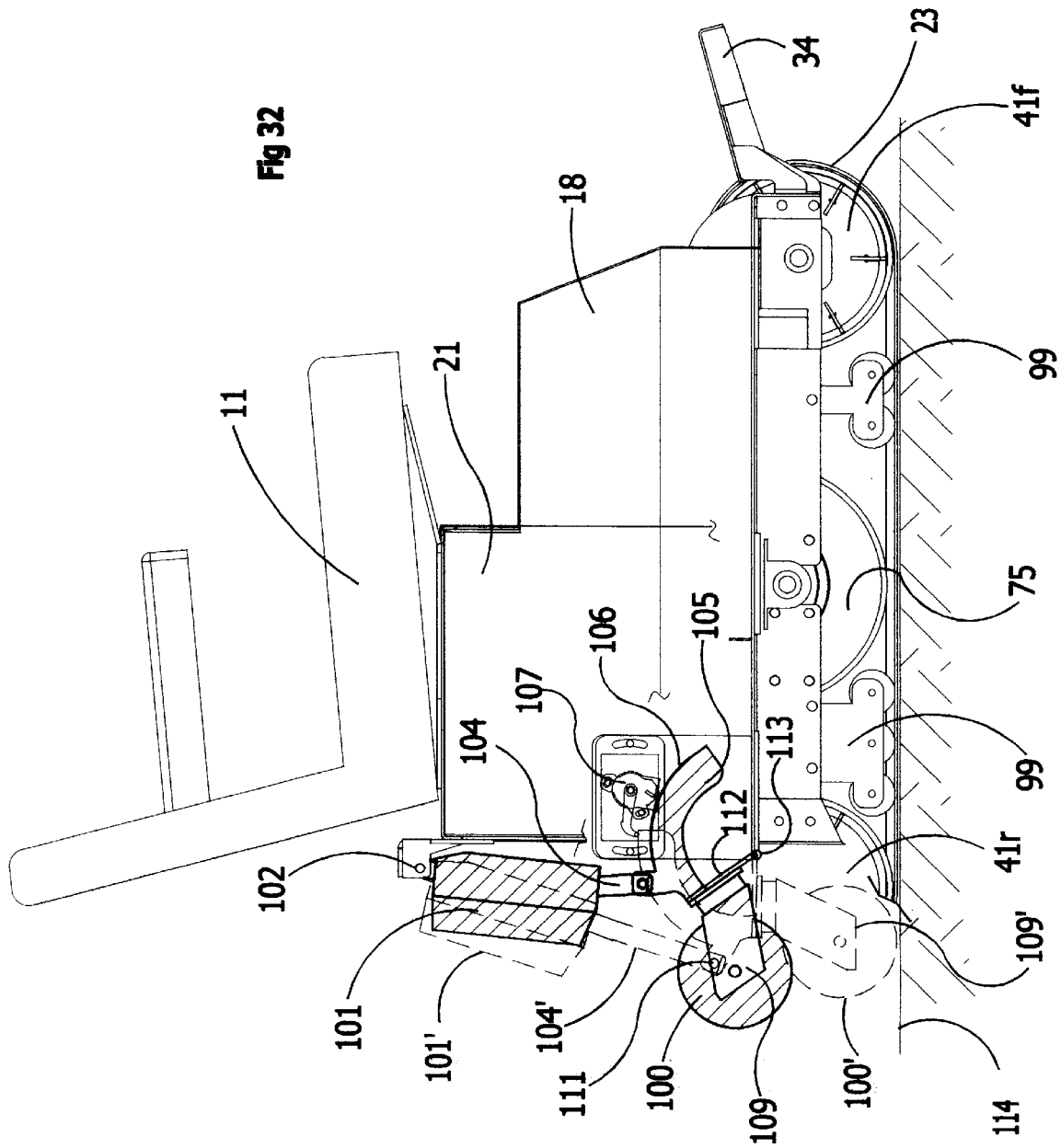

FIG. 32 is a side view of the multi-point mobility device with the rear wheel shown in both an up and down position, with the curved flange providing a means by which the sensor is able to detect the extent of the upward and downward position of the rear wheel.

FIG. 33 is a rear view of the multi-point mobility device with the rear wheel shown in a raised or a position.

FIG. 34 is a rear view of the multi-point mobility device with the rear wheel is in a down position, so that a rear space is created between the track assembly rear wheel and the ground.

FIG. 35 is a side view of a belt assembly, in which the center wheel is in the down position with the rear wheel in an up position so that a maximum amount of track can contact the ground surface.

FIG. 36 is a side view of a belt assembly, in which the center wheel has been lowered, causing the track between the rear drive wheel and center wheel to remain on the ground, with the front wheel and front portion of the track raising upward off of the ground.

FIG. 37 is a side view of the belt assembly, in which the center wheel is in the down configuration, and the rear wheel is also in a down configuration, so that the points of contact with the ground are limited to three points, comprising the rear wheel, and that portion of the track immediately below the center wheel.

FIG. 38 is a side view of the belt assembly, in which the center wheel is in an up position, so that the track is presented in the same plane along its length from the rear drive wheel to the front wheel, so that when the rear wheel is urged downward far enough, it will cause that portion of the track behind the front wheel to be raised off of ground, giving the track assembly the equivalent of front wheel drive capability.

FIG. 39 is a view from top of the multi-point mobility device as it negotiates through a sharp corner.

FIG. 40 is a perspective view of the front end of the frame, showing the adjustment bolt placement.

FIG. 41 is a perspective view of the adjustable axle holder, with the adjustment bolt shown.

FIG. 42 is a side view of the adjustable axle holder.

FIG. 43 is a perspective view of the sensor flange.

FIG. 44 depicts a front view of the flange shown in FIG. 43.

FIG. 45 depicts the sensor flange shown in FIGS. 43 and 44, from a side view, with the sensor means and rotating sensor arm in contact with the angled end of the sensor flange.

FIG. 46 depicts the sensor flange in a rotated condition as compared with the drawing of FIG. 45.

DESCRIPTION OF THE PREFERRED EMBODIMENT

Figure 1:
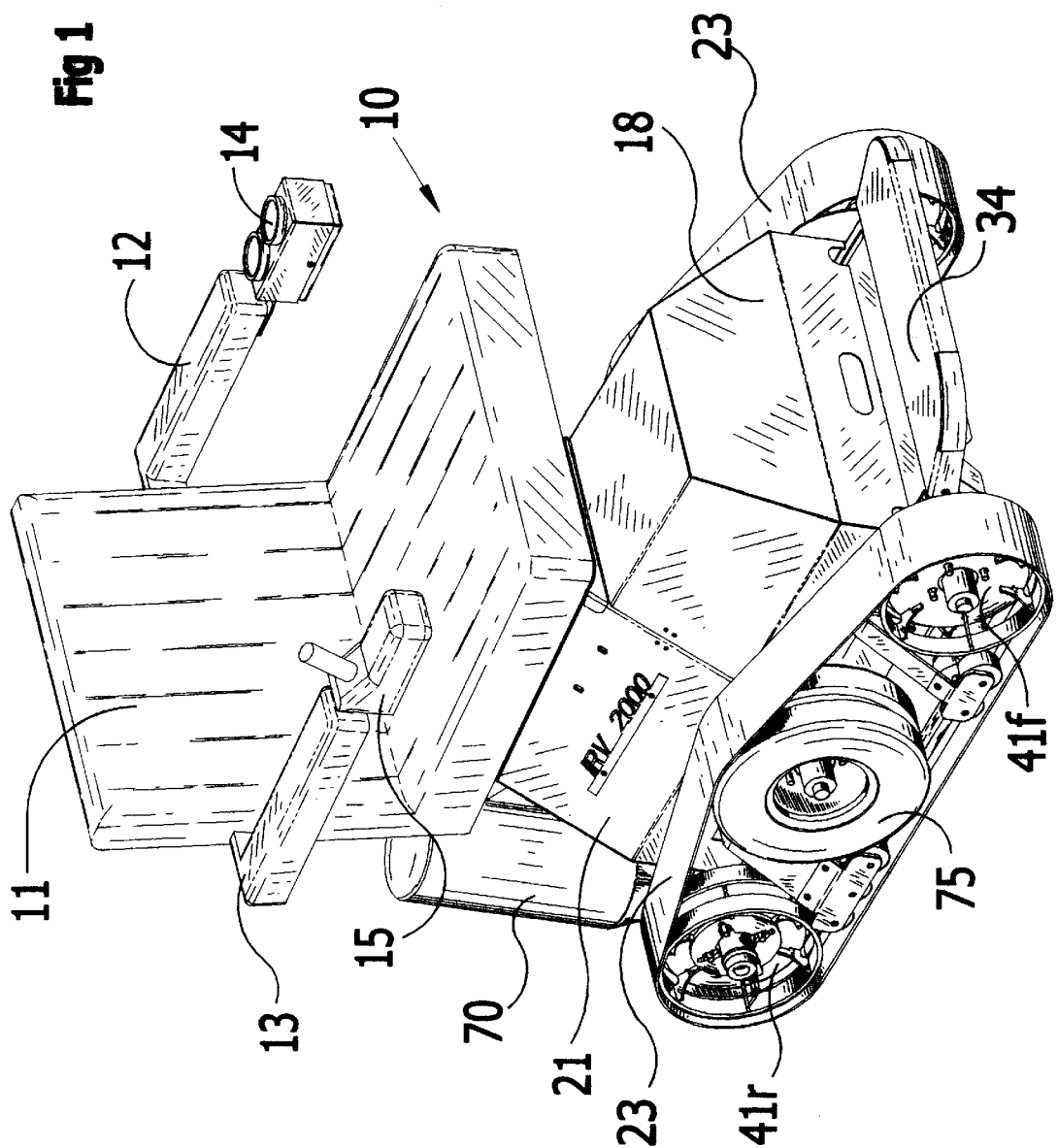
FIG. 1 is a perspective view from the upper and front portion of the invention.

Referring now to FIG. 1, the multi-point mobility device 10 is shown. The seat 11 is provided for a person using this device, with arm rests 12 and 13 supporting gauges 14 and the control mechanism 15. As is shown in FIG. 1, this device is maneuvered using a belt track assembly which is positioned on either side of the multi-point mobility device 10.

Figure 2:
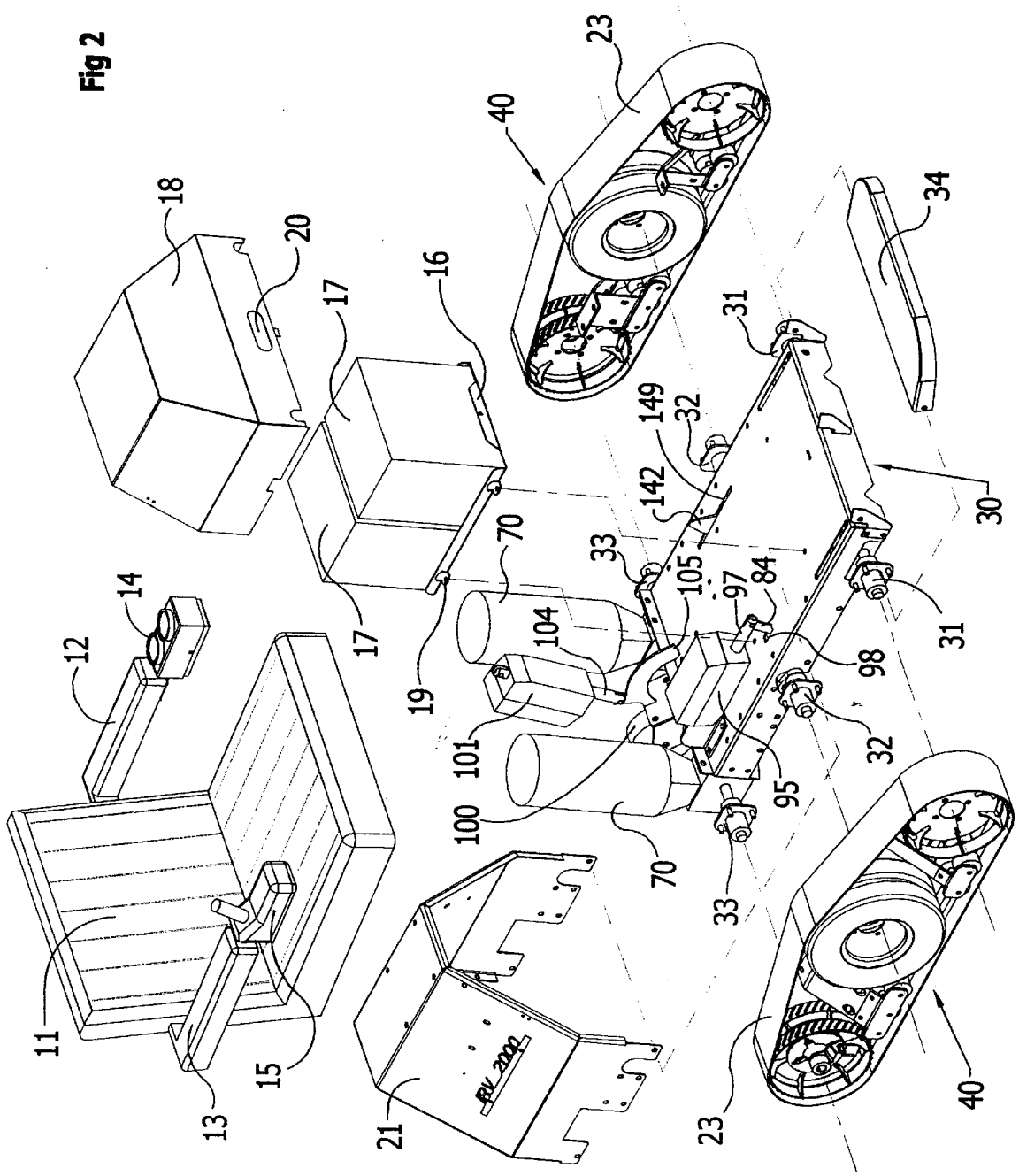
FIG. 2 is an exploded view of the invention, showing the major component parts of this invention as single units.

Referring also now to FIG. 2, an exploded view of the multi-point mobility device 10 is shown. A centrally located frame 30 provides the platform from which the rest of the apparatus is supported. Frame 30 provides support for a plurality of axle's terminating in wheel attachment hubs. As is shown in FIG. 2, the frame provides a support for a front axle hub 31, a center axle hub 32 and a rear axle hub 33, with a similar set of hubs 31, 32 and 33 positioned on the opposite side of frame 30.

Also shown in FIG. 2 are two opposing track assemblies 40, which contain various wheels and apparatus, and which will be discussed more fully below. Each track assembly 40 has its respective wheels attached to hubs 31, 32 and 33, so as to provide the placement of a belt parallel to the belt on the second track assembly 40 on the other side of the frame 30.

A foot rest 34 is attached to frame 30, and is situated to the front and bottom portion of the front side of the multi-point mobility device 10, as is shown also in FIG. 1. The placement of the track assemblies 40, as shown in FIG. 2, are also shown in FIG. 1 with the rear wheel 41r attached to the rear axle hub 33, the center wheel 75 attached to the center axle hub 32, and the front wheel 41f attached to the front axle hub 31.

The seat 11 is supported and elevated off of the frame 30 by a seat mount 21, which generally comprises a rigid sheet that has been configured into an inverted U-shape, providing an area in which the seat 11 may be suitably attached.

Two drive motors 70 are attached to the frame 30, as shown in FIG. 2, and provide power to the rear axle hub 33. As is shown in this figure, the only hub that provides drive power to the track assembly 40 is the rear hub 33. In no way should this be construed as a limitation on the location for presenting rotational power to an axle hub. Since the track assembly 40 will be transferring movement to a contiguous belt, the wheel that provides rotational force may be either the front wheel 41f or the rear wheel 41r or both wheels 41f and 41r concurrently. In this particular discussion of this multi-point mobility device 10, rotational energy is transferred from the drive motors 70 to the rear wheel 41r.

One of the reasons for placement of the drive motors 70 at the rear portion of the frame 30 is to counter balance the electrical energy storage weight for the front of the frame 30. As is shown in FIG. 2, a battery tray 16 is attached to the frame 30 by connection points 19, where said tray 16 limits lateral movement of batteries 17. Each battery used may weigh approximately 50 pounds or more. It has been found advantageous to connect each battery 17 in series with the other, so as to provide maximum power and energy storage capability. Typically, the battery 17 will be a "gel cell", which allows the transportation of either the batteries 17 alone, or along with the entire multi-point mobility device 10 on common carriers, which do not restrict the transport of gel cell batteries as they do other types of batteries. It should be understood, however, that the use of batteries 17 should be construed as a power supply, and that an analogous power supply could also be from an electrical supply extension cord.

As is shown in FIG. 1 and FIG. 2, a battery cover 18 shields the batteries 17 from external contact. The frame 30 may be adapted with a connection means to accept placement of the battery cover 18.

Simple removal of said battery cover 18 is accomplished preferably by lifting said battery cover at the hand hole opening 20.

Referring now also to FIG. 3, the placement of the batteries 17, in relation to the rest of the invention is shown. The batteries 17 are placed forward of the seat 11, but behind the location where a person's feet would be positioned on the foot rest 34. This gives a more optimal distribution of weight so that the center of gravity from front to back of the multi-point mobility device 10 is just slightly to the rear of the center axle hub 32 and center wheel 75.

Referring now to FIG. 4, the construction of the wheel 41 is shown. The general construction of wheel 41 is able to be used as a rear wheel 41r and front wheel 41f. As is shown in FIG. 4, a rigid wheel disc 45 is provided, in which a plurality of ear receiving notches 48 are defined that are spaced around the peripheral edge 47 of disc 45. A centrally located hub aperture 46 is defined by disc 45, which can accommodate either the front axle hub 31 or the rear axle hub 33.

A plurality of mounting ears 42 are placed upon disc 45, which provide spacers for the attachment of wheel bands 49. As is shown more clearly in FIG. 5, each mounting ear 42 is triangularly shaped with two band mount areas 44 and a centrally located ear belt notch 39. A mounting band notch 43 is also defined by mounting ear 42, with the width of the mounting ear 42 slid into the ear receiving notch 48, with the mounting notch 43 concurrently accepting the width of the wheel disc 45. Once the mounting ear 42 and disc 45 have been urged together, so that the ear receiving notch 48 is occupied by the width of the mounting ear 42, and the mounting notch 43 is fully occupied by the width of the wheel disc 45, these two parts 42 and 45 are fixed to each other, generally through welding where the parts are metallic.

When all mounting ears 42 have been fixed to the wheel disc 45, a wheel band 49 is fixed to one side of all ears 42 at the band mount areas 44. A second wheel band 49 is fixed to be other band mount area 44 of each ear 42. Bands 49 have an outer side 50 and an inner side 51. The inner side 51 is fixed to the corresponding band mount 44 with the outer side 50 having a traction band 52 placed over it. The traction band 52 is provided with an inner surface 55 which attaches to the outer surface 50 of band 49. The traction band 52 is also supplied with a series of raised ridges 54, which provide a more effective means of gripping the inside surface of a belt.

As it is shown in FIG. 6 and FIG. 7, a completed wheel 41, when used as a rear wheel 41r is shown. The rear wheel 41r is provided with a drive disc 56, which defines a central hub hole 58, which is able to accommodate the insertion of the rear axle hub 33, and a series of drive notches 57 which are defined at several positions around the drive disc 56 so as to not interfere with the placement of any attachment bolts or nuts that are used to fix rear wheel 41r to the rear axle hub 33.

A drive engage means 73 is also shown in FIG. 6, which comprises a bushing 59, where said bushing 59 defines an axle hole 60, into which the end of drive axle 72 is fixed. Bushing 59 is attached to a drive arm 61 that supports a plunger assembly 62. The plunger assembly 62 allows manipulation of a pin 64 using a spring actuating lever 63, which fixes the pin 64 in a protruding or withdrawn position.

Referring now also to FIG. 8, the drive arm 61 and plunger assembly 62 are shown adjacent to the drive disc 56.

When drive axle 72 rotates, it will cause bushing 59 to likewise rotate, thus moving the drive arm 61 and plunger assembly 62 in a circular direction. If the pin 64 is withdrawn, the drive arm 61 and plunger assembly 62 will rotate unhindered adjacent to the drive disc 56.

Referring now to FIG. AA, which is a cross-sectional view of FIG. 8, the plunger assembly 62 is shown with the pin 64 protruding into the drive notch 57. If the bushing 59 is rotated, while pin 64 is protruding into the drive notch 57, the pin 64 will cause the drive disc 56 to rotate. Since the drive disc 56 is fixed to the wheel disc 45 of rear wheel 41r, this will cause the entire rear wheel 41r to rotate concurrently with the drive axle 72.

Referring now also to FIGS. 9 and 10, the drive motor is shown which directs rotational energy into a gear box 71 which transfers said rotational energy into drive axle 72. Rear wheel 41r is shown in FIG. 9 as being connected directly to the drive axle 72. FIG. 10 displays the drive axle 72 protruding through wheel 41r and drive disc 56, and through the rear axle hub 33 into the bushing of the drive engage means 73.

As is shown in FIG. 2, each rear wheel 41r has its own drive motor 70, that allows the rear wheels 41r to operate independently of each other with regard to direction and speed of rotation. Drive motors 70 are able to turn their respective axles 72 at various speeds and in either direction, through the control means 15.

Referring now also to FIG. 11, FIG. 12, and FIG. 13, the center wheel 75 is shown. The center wheel 75 has a greater circumference than does either the front wheel 41f or the rear wheel 41r. The center wheel 75 is set on a rim 76 that is able to be attached to the center axle hub 32, as depicted in FIG. 2. The center wheel 75 has a side wall 77 that terminates at a peripheral edge 78, upon which the wheel 75 makes contact with the belt of the track assembly 40 along the peripheral edge 78. Preferably, the center wheel 75 defines a groove 79 that encircles the central portion of the peripheral edge 78. This groove 79 should have a sufficient width and depth so that it can accommodate the belt guide used in common track belts 23 within the track assembly 40.

In order for this invention to accomplish the plurality of ground contact points that are desired, the center wheel 75 must be able to be raised and lowered in relation to the front wheel 41f and rear wheel 41r. There are many methods commonly known in the art to raise and lower wheels and wheel axles, such as hydraulic systems, rotational screw drive motors, as well as manual adjusting means. The scope of this invention is intended to cover a means of raising and lowering the center wheel, and any discussion regarding the preferred embodiment should not be considered the limitation to the single method disclosed.

The method of raising and lowering the center wheel 75 in this invention is accomplished through the rotation of the central axle 81. Referring now to FIG. 14 and 15, the center wheel assembly 80 is shown. FIG. 14 depicts a bottom view of this center wheel assembly 80. The central axle 81, as shown in FIG. 15, has a pivoting axle lever in the form of and L-shaped member 83 fixed to said axle 81. The distal ends of axle 81 are positioned through mounting brackets 82, with the distal end of said axle 81 being fitted into offset axle assemblies 88, as shown in FIG. 15. The offset axle assemblies 88 are then fixed to the center axle hub 32, with said hub 32 providing the rotation ability and position for the center wheel 75.

The central axle 81 is prevented from rotating by the L-shaped member 83, which likewise prevents rotational movement of the offset axle assembly 88, located on each distal end of said axle 81. If rotation of axle 81 occurs, a concurrent rotation of the offset axle assembly 88 also takes place.

As is shown in FIG. 16 and FIG. 17, the axle 81 has been rotated 90 degrees, as is evidenced by the change in position of the L-shaped member 83. As the L-shaped member 83 has rotated, the offset axle assembly has rotated a similar degree of rotation, causing the hub 32 to be moved in relation to the fixed axle 81.

Referring also now to FIGS. 18–20, the L-shaped member 83 is comprised of a bushing 87 that allows the axle 81 to be placed through said bushing 87 with the bushing 87 then fixed securely to axle 81 along its length at a desired position. The bushing 87 is placed through the bushing receiving hole 86 of the L-shaped member 83. The L-shaped member 83 has an extension arm 84 which defines an actuator connect hole 85 at its terminating end.

Referring now to FIG. 22 and FIG. 23, the offset axle assembly 88 is shown, being comprised of a offset mount 90 defining a bushing hole 91 and an off set axle hole 92. The bushing 89 is attached to the distal end of axle 81, and it is fixed within the offset mount 90 of bushing hole 91. The offset axle 93 is also placed within the outset axle hole 92, with all three pieces being secured to one another, so as to provide a single rigid piece.

As is shown in FIGS. 24 and 25, the off set axle assembly 88, as viewed from the bushing 89 side, depicts the axle hole 74 into which the distal end of axle 81 is fitted. As is shown in FIGS. 22–25, the offset axle 93 provides an extension of axle 81 that has been fitted within bushing 89, however this extension, being the offset axle 93, effectively orbits the axial line of axle 81, when axle 81 is rotated. Considering the position of the offset axle 93 in relation to the axle 81, when positioned within axle hole 74, the offset axle 93 and axle 81 would occupy the same level of height in relation to the ground surface 114. If axle 81 is rotated 90 degrees, while it is fixed within the axle hole 74, as is exemplified in FIG. 25, the offset axle 93 will move in an arcual orbital path until said offset axle 93 is positioned immediately below axle 81 in the axle hole 74. This movement would therefore reposition any wheel that is attached to the offset axle 93 by causing the wheel to move downward in relation to its previous position.

FIG. 20 and FIG. 21 exemplify the change in position of the L-shaped member 83 during normal raising and lowering of the center wheel 75. FIG. 26 and FIG. 27 depict the variations in position of the extension arm 84, and offset axle 93 following a rotation of the axle 81 of approximately 90 degrees. This amount of axial rotation causes the offset axle 93 to follow its arcual path to reposition itself downward below axle 81.

Manipulation of the extension arm 84 is performed by an axle actuator 95, as shown in FIG. 28 and 29. The similar position of the extension arm 84, axle 81 and offset axle 93 are shown in FIG. 26 and FIG. 28. The axle actuator 95 is typically attached at one end to a pivoting mount 96, which generally comprises a protruding pin that is placed through a receiving hole, and at the other end to be extension arm 84 at the actuator connect hole 85.

The axle actuator 95 causes an axle actuator arm 97 to move in and out of the main body of the axle actuator 95, so as to increase the distance between the pivoting mount 96 and actuator connect hole 85, or decrease the distance between the pivoting mount 96 and actuator connect hole 85. Since the pivoting mount 96 remains stationary in relation to the frame 30, any lateral movement caused by the axle actuator arm 97 is transferred in full to the extension arm 84 of the L-shaped member 83.

Referring now specifically to FIG. 28, when the axle actuator arm 97 is fully retracted within the axle actuator 95, the extension arm 84 is in an upright position. The axle 81 and offset axle 93 are each parallel to the frame 30, as well as to the ground below. Referring now also specifically to FIG. 29, if the axle actuator arm 97 is extended out of the axle actuator 95, this will cause the extension arm 84 to follow an arcual path around axle 81, and will cause axle 81 to rotate. The off set axle 93 will also then follow its arcual orbital path for approximately 90 degrees of its full orbital path, so that the offset axle 93 is then positioned below axle 81. Offset axle 93 moves downward in relation to the fixed frame 30 and fixed axle 81. As it is exemplified in FIGS. 28 and 29, the axle actuator 95 moves up and then on around the pivoting mount 96, by the connection made by the axle actuator arm 97 to the extension arm 84, as the actuator connect hole 85 follows a downward arcual path as the axle actuator arm 97 extends outward from the axle actuator 95.

Referring now to FIG. 30, the cut away view depicting the axle actuator 95 shows that the extension arm 97 is retracted so that the extension arm 84 is in an upright position, with the axle 81 and offset axle 93 being parallel to the ground 114. In this configuration, the center wheel 75 is in an up position, so that the bottom of wheel 75 is able to press the belt 23 uniformly against a flat ground surface 114 to currently with the front wheel 41*f* and rear wheel 41*r*. In addition, one or more sets of bogey wheels 99 are generally used with track assemblies 40 so as to provide a consistently supported track on a smooth ground surface 114. When the center wheel 75 is in the up position, as shown in FIG. 30, the bottom of said wheel 75 will be parallel with the bottom of rear wheel 41*r*, front wheel 41*f*, and bogey wheels 99. As is also shown in FIG. 30, the rear wheel 100 is also in an up position.

Referring now to FIG. 31. The cut away view depicts the axle actuator 95 as having extended the axle actuator arm 97 from the retracted position shown in FIG. 30, to the extended position shown in FIG. 31. The extension arm 84 has rotated around the axle 81 so that the offset axle 93 has caused the center wheel 75 to move downward in relation to the front wheel 41*f* and rear wheel 41*r*. Also shown for clarity sake, the rear wheel 100' is depicted in its down position against the ground surface 114. In this manner, both the front wheel 41*f* and the rear wheel 41*r* are equidistant above the ground surface 114, with a front space 94 defined as the area between the belt track 23 that is in contact with front wheel 41*f*, and the ground surface 23, and a back space 110 defined as the area between the belt track 23 that is in contact with the rear wheel 41*r* and the ground surface 114.

When the center wheel 75 has been urged downward, the track belt 23 is no longer able to be presented to the ground surface 114 by all three wheels 41*r*, 41*f* and 75 simultaneously. Although the angle of the track belt 23 has been altered, the bogey wheels 99 are able to account for the variation in the angle of the track belt 23 between the rear wheel 41*r* and center wheel 75, and the opposing angle between center wheel 75 and front wheel 41*f*. Due to the fact that the center wheel 75 is larger than either the front wheel 41*f* or the rear wheel 41*r*, and because the upward and downward movement is not significant, other than the downward position places the center wheel 75 slightly below the plane defined by the bottom edges of the front wheel 41*f* and rear wheel 41*r*, there is no significant change as to the tension of the track belt 23 when the center wheel 75 either lowers or raises.

Although the configuration shown in FIG. 31 depicts ground contact by the track belt 23 that is in concurrent contact with center wheel 75, and the rear wheel 100', it is necessary that utilization of and interaction by the rear wheel 100' is done in order to accomplish all of the possible multiple points of contact by the track belt 23 and ground surface 114.

Referring now to FIG. 32, the rear wheel 100 is a single independent wheel that is able to be raised off of the ground surface 114 to rear wheel position 100, as well as lowered to press against the ground surface 114 to rear wheel position 100' so as to provide an additional point of ground surface contact.

FIG. 32 depicts the rear wheel 100 in an up configuration, where said rear wheel 100 is attached by its axle to the rear wheel mount 109 that descends downward from a rear wheel mount 112 which rotates about a mount hinge 113, where said mount hinge 113 is attached to frame 30. As FIG. 32 also depicts, a rear wheel actuator 101 is shown in the rear wheel 100 up configuration. The rear wheel actuator 101 works in a manner similar to the axle actuator 95, in that an actuator rod 104 is urged up and down by the rear wheel actuator 101. The rear wheel actuator 101 is connected at the top end to a stationary pivot mount 102, with its descending actuator rod 104 attached peripherally to a curved flange 105 that extends upward from the rear wheel mount 112.

When the rear wheel moves from its down position 100' to its up position 100, a curved flange 105 is also rotated about hinge 113. The peripheral edge 106 of the curved flange 105 follows a spiral orbit track about hinge 113. As the length of the peripheral edge 106 moves past a stationary sensor 107, the distance from hinge 113 to the peripheral edge 106, at the point where it contacts the stationary sensor 107, will decrease as the rear wheel 100 moves to its up position. If it is rotated from the upper position 100 to the down position 100', the peripheral edge 106 will move past stationary sensor 107, with the diameter of the orbital path, having the hinge 113 as its center, of the peripheral edge 106 increasing as the curved flange 105 moves towards the rear of the multi-point mobility device 10. The amount of increase or decrease in the distance between hinge 113 and peripheral edge 106 that is determined by the sensor 107, is converted into displayed information that is viewable on the gauge 14 located on arm rest 12.

Referring also now to FIG. 33 and FIG. 34, FIG. 33 depicts a rear view of the multi-point mobility device 10, in which the rear portion of track belt 23 is in contact with the ground surface 114. The up position of rear wheel 100 is shown, with rear wheel 100 not in contact with the ground surface 114. The rear wheel actuator 101 has the actuator rod 104 retracted within it, to hold the rear wheel 100, (also referred to as an independent rear wheel 100 at times, to differentiate it at times from the rear drive wheel 41r), up from the ground surface 114. FIG. 34, by comparison, depicts the situation where the rear wheel actuator 101' has extended actuator rod 104' so that the rear wheel 100' (also referred to as an independent rear wheel 100' at times, to differentiate it at times from the rear drive wheel 41r) is in a down position, to the point that rear wheel 100' has been urged downward below the plane of ground contact by the track belts 23 around the rear wheels 41r. As FIG. 34 depicts, the force of the rear wheel 100' against the ground surface 114 has caused the rear portion of the multi-point mobility device 10 to be raised off of the ground surface 114, defining a rear space 110 between the bottom of track belt 23 and the ground surface 114. As is depicted in FIG. 34, when the rear wheel 100' is fully in the down position, the rear portion of track belts 23 around the rear wheel 41r do not continue in contact with the ground surface 114. As will be more fully shown in the following figures and discussion, the actuator of the rear wheel 100 to the up position or to the down position 100' up will allow various portions of the track belt 23 to make contact with the ground surface 114.

Referring now to FIGS. 35–38, the four basic configurations involving the rear wheel in the up position 100 and the rear wheel in the down position 100' are shown, along with the two settings of the center wheel 75 in its up or down position. As is shown in these figures, four variations of track belt 23 ground surface 114 contact settings are available.

Referring now specifically to FIG. 35, the standard configuration for the track belt 23 is shown. In this setting, the track belt 23 has a maximum surface area contact with the ground surface 114. The center wheel 75 is in a top position, so that the track belt 23 beneath wheels 41r, 75, and 41f concurrently contact the ground surface 114. The rear wheel 100 is in an up position and does not in anyway affect the amount of force applied along the length of the track belts 23 with the ground surface 114. Bogey wheel sets 99 are not depicted in FIGS. 35–38, but they continue to guide the track belt 23 as discussed previously.

The configuration shown in FIG. 35 would be desired when maximum traction is necessary for movement. Small imperfections in ground surface 114 conditions would be virtually unnoticeable, with regard to traction coefficients, using the configuration shown in FIG. 35. This configuration, however, requires that one track belt 23 move at a different speed or direction then the second track belt 23, when negotiating a turning movement. The common term applied to the steering capability in this setting shown in FIG. 35 is known as the "skid steer" operation. To turn, using the skid steer operation, one track belt 23 continues to move while the opposing track belt 23 on the other side of the multi-point mobility device 10, is substantially slowed, stopped, or even moved in the reverse direction, depending on the degree of turning desired. The independently operated drive motors 70, as shown in previous figures, allow the operator of this device 10 to affect the turning direction and speed up the track belts 23 individually using the control means 15 previously described. This turning ability has significant lateral friction, and causes excessive scraping on indoor flooring, and is extremely destructive to carpets.

Referring now specifically to FIG. 36, the second possible configuration for the track belt 23 is shown. In this configuration, the rear wheel 100 remains in an up position, and does not directly affect the placement or movement of track belt 23. The center wheel 75 however, has been moved from its upward position downward, using a means to alter its height position in relation to the stationary front wheel 41f and rear wheel 41r. In this configuration, the center wheel 75 has been lowered to the point that the rear wheel 41r and front wheel 41f are unable to be in contact with a level ground surface 114 at the same time. The center wheel 75 acts as a fulcrum, being the lowest position wheel in the track belt assembly 40. Generally, the majority of the weight of the multi-point mobility device 10 will be between the center wheel 75 and the rear wheel 41r. This will cause the entire multi-point mobility device 10 to tilt backwards slightly raising its front end at the point of the front wheel 41f slightly off of the ground surface 114, creating a front space 94 in which there is no contact with the track belt 23 and a level ground surface 114.

The configuration shown in FIG. 36 effectively reduces the amount of track belt 23 contact with a level ground surface 114 by approximately ½, as compared to the amount of track belt 23 contact with a level ground surface 114 as shown in FIG. 35. The skid steer operations that are able to be performed are not significantly different, with regard to turning applications, except that slightly sharper turns may be possible. The benefit offered by the configuration of FIG. 36 is that forward movement of the multi-point mobility device 10 over a soft ground surface 114 is more easily accomplished. Snow, sand, mud, and loose soil surfaces in general, are readily drawn under the front portion of the track belt 23 under front wheel 41f, which then is able to compact the loose snow, sand, mud or soil, which the remainder of the track belt 23 in contact with the ground surface 114 is able to move across the now compacted ground surface 114.

Referring now specifically to FIG. 37, the third configuration of the track belt 23 is shown. In this configuration, the center wheel 75 is lowered in the same manner as described above for FIG. 36. In this third configuration, however, the rear wheel 100' has been moved to a downward position which has caused the rear portion of the multi-point mobility device 10 to be raised slightly off of the ground creating a rear space 110, as defined between the track belt 23 below the rear wheel 41r, and the ground surface 114. The rear wheel 100' is lowered only to the point where the position of rear wheel 41r and front wheel 41f are level and each positioned slightly above the ground surface 114. The front wheel 41f is elevated in the same manner as the rear wheel 41, defining a front space 94.

As is obvious by the comparison between FIGS. 36 and 37, the center wheel 75 is lowered more significantly in the configuration developed in FIG. 37 than the configuration shown in FIG. 36. Again, a sensor means it is desirable to determine the amount of movement of the center wheel 75 in relation to the frame 30 and wheels 41r and 41f.

The configuration shown in FIG. 37 minimizes belt contact with the ground surface 114. In this configuration, the only points of contact with the ground surface 114 comprise the rear wheel 100', and that portion of the track belt 23 immediately below the center wheel 75. This creates a three-point contact, with steering and speed control realized through movement of the track belt 23. The independent movement of each track belt 23 allows the operator to skid steer the multi-point mobility device 10, but with minimal track belt 23 contact with the ground surface 114. This configuration allows for extremely sharp turning, with little lateral friction applied by the track belt 23 against the ground surface 114. The operation of one drive motor 70 forward, with the second drive motor 70 moving backward, results in the realization of a near circular spin turn ratio. It is this configuration that is most useful in an indoor setting, in which the multi-point mobility device 10 is being operated on indoor flooring or carpets. The amount of lateral friction applied by the configuration shown in FIG. 37 is many times less than the lateral friction applied by the configuration shown in FIG. 35 or 36 during turning maneuvers.

Referring now specifically FIG. 38, a fourth configuration for the track belt 23 this shown. In this configuration, the rear wheel 100' is lowered so that it contacts the ground surface 114 in the same manner as shown being described in FIG. 37. The rear wheel 100' causes the rear portion of the multi-point mobility device 10 to be raised off of the ground surface 114 to create space 110. In this configuration, however, the center wheel 75 is raised to its up position, so that the wheels 41r, 75 and 41f are in the same configuration relationship as shown in FIG. 35. Because the rear wheel 100' has caused the rear portion of the multi-point mobility device 10 to be elevated, the track belt contact with the ground surface 14 is limited to the front portion of the track belt 23 directly below front wheel 41f. In this configuration, the multi-point mobility device 10 is able to operate on three points of ground contact. The surface area of track belt 23 in contact with the ground surface 114 is limited, depending on the amount of tilt angle applied by the elevation caused by the rear wheel 100'.

As is shown by the comparisons between FIG. 37 and 38, the rear wheel 100' may be lowered to different levels. In FIG. 37, the rear wheel 100' has been lowered below the linear plane of ground surface 114 contact. Comparatively, the rear wheel 100' and FIG. 38, while it has also been lowered below the linear plane of the wheel 41r and 41f ground surface 114, it has not been lowered to such an extent as shown in FIG. 37. Depending on the ground surface 114 conditions, the amount of rear lift supplied by the lowering of the rear wheel 100' may be determined by the operator using the gauge means 14.

The configuration shown in FIG. 38 allows the multi-point mobility device 10 to be used with three points of ground surface 114 contact, with the steering capability realized at the extreme front end of the device 10. Using this configuration, certain sharp corners with little turning room can be navigating through, using the configuration shown in FIG. 38, and also, if necessary, switching between configurations shown in FIG. 38 and FIG. 37. The fourth configuration described above allow the rear portion of the device 10 to be swung around in certain tight turn situations.

Referring also now to FIG. 39, an example of the sharp turning capability of the multi-point mobility device 10 is shown. The starting position of the multi-point mobility device 10 is indicated as start position 15. As the multi-point mobility device 10 uses the configuration shown in FIG. 38, the multi-point mobility device 10 is able to navigate around this extremely confining corner, using either the center portion of the track belt 23 and rear wheel 100', or using the front portion of the track belt 23 to swing the rear portion and rear wheel 100' of the multi-point mobility device 10 outward during the turning process as shown by position 116, so that it can realize the proper end turn position indicated as 117.

The tension of the track belt 23 is adjustable by repositioning the front wheel 41f along the length of the frame 30. As shown in FIGS. 40–41, the axle of the front wheel 41f is placed through axle hole 127, which is defined by the adjustable axle holder 124. The adjustable axle holder 124 is comprised of an axle flange 125 which descends downward at a 90 degree angle from the adjustment flange 126. Perpendicular to flanges 125 and 126 is an attached nut 128 that is able to receive an adjustment bolt 129. The adjustment flange 26 has at least one setting bolt 131 which is positioned along the length of the adjustment groove 123, which is defined by the frame top side 133. The setting bolt or bolts 131 are moved along a length of the adjustment groove 123 so as to move the front wheel 41f forward or backward to increase or decrease the tension on the track belt 23. Fine tuning adjustments are made by the turning of the adjustment bolt 129 within the nut 128. Nuts 132 are able to be tightened down over bolts 131 to secure the position of the adjustable axle holder 124.

The sensor means provided for the raising and lowering of the center wheel 75 is show in FIGS. 44–46. Referring also to FIG. 2, the blade 142 is seen protruding upward through the sensor groove 149 on the top side of the frame 30.

The sensor means is comprised of a sensor flange 140, having a blade 142 with an angled end 143. The sensor flange 140 rotates about the axle 81 which is fixed to bushing 141, so that the sensor flange 140 rotates concurrently with axle 81. FIG. 45 and FIG. 46 depict the axle rotation in which the sensor means 145 has been properly leveled by the tightening of a level bolt 146 within the adjustment guide 147. A rotating sensor arm 148 directly contacts the angled end 143, and as the blade 142 rotates, the rotating sensor arm 148 pivots to accommodate the angled end 143 as it passes below it. The amount of rotation of the rotating sensor arm 148 is displayed on the gauges 14 for benefit of the operator.

This multi-point mobility device 10 is capable of reaching the configurations shown in FIG. 35 and FIG. 36 where an independent rear wheel 100 is not present, or simply not been utilized. It should be understood that the scope of this invention anticipates that the track assembly 40 may be configured to that shown in FIG. 36 without requiring a rear wheel 100.

From the foregoing statements, summary and description in accordance with the present invention, it is understood that the same are not limited thereto, but are susceptible to various changes and modifications as known to those skilled in the art and we therefore do not wish to be limited to the details shown and described herein, but intend to cover all such changes and modifications which would be encompassed by the scope of the appended claims.

I claim:

1. A multi-point mobility device, capable of providing a plurality of ground surface contact points, comprising:
    a. A pair of track belt assemblies, with each one positioned on either side of a supporting frame, in which each track assembly has a front wheel, a rear wheel and a central wheel upon which a track belt is able to rotate around;
    b. Two independent drive motors, with each motor able to rotate a single track belt assembly; and
    c. A means to raise or lower the central wheel of the track belt assembly, where the center wheel of the track assembly is larger then the rear drive wheel or front wheel, and where said track belt remains in constant contact on both the top side and bottom side of the center wheel.

2. A multi-point mobility device, capable of providing a plurality of ground surface contact points, as recited in claim one, in which a battery power source is supported by the front area of the frame, with the center of gravity for this device located between the center wheel and rear drive wheel.

3. A multi-point mobility device, capable of providing a plurality of ground surface contact points, as recited in claim 1, in which the means to raise or lower the center wheel of the track belt assembly is capable of lowering the central wheel sufficiently below the remaining wheels in the belt track assembly, so that the center wheel operates as a fulcrum, causing the front portion of the belt tracks to raise off of the ground surface.

4. A multi-point mobility device, capable of providing a plurality of ground surface contact points, as recited in claim 1, in which the means to raise or lower the center wheel of the track belt assembly comprises an axle actuator which is capable a rotating a central axle, which is attached at its distal ends to a respective offset axle assembly, where said offset axle assemblies are each connected to their respective central wheel in the belt track assembly, so that when the axle actuator rotates the central axle, the offset axle is caused to move in an arcual orbital path around the central axle, causing the central wheel of the belt track assembly to move upward or downward.

5. A multi-point mobility device, capable of providing a plurality of ground surface contact points, as recited in claim 1, in which the drive motors are able to be operated independently.

6. A multi-point mobility device, capable of providing a plurality of ground surface contact points, as recited in claim 1, in which the means to raise and lower the central wheel of the track belt assembly includes a sensor that determines the amount of longitudinal movement of the central wheel, and which is capable of displaying this information to the user of the device.

7. A multi-point mobility device, capable of providing a plurality of ground surface contact points, comprising:
    a. A pair of track belt assemblies, with each one positioned on either side of a supporting frame, in which each track assembly has a front wheel, a rear wheel and a central wheel upon which a track belt is able to rotate around;
    b. Two independent drive motors, with each motor able to rotate a single track belt assembly;
    c. A means to raise or lower the central wheel of the track belt assembly; and
    d. A means to raise or lower an independent rear wheel, at the rear of the multi-point mobility device.

8. A multi-point mobility device, capable of providing a plurality of ground surface contact points, as recited in claim 7, in which a battery power source is supported by the front area of the frame, with the center of gravity for this device located between the center wheel and rear drive wheel.

9. A multi-point mobility device, capable of providing a plurality of ground surface contact points, as recited in claim 7, in which the center wheel of the track assembly is larger then the rear drive wheel or front wheel, with the track belt remaining in constant contact on both the top side and bottom side of the center wheel.

10. A multi-point mobility device, capable of providing a plurality of ground surface contact points, as recited in claim 7, in which the means to raise or lower the central wheel of the track belt assembly is able to lower the central wheel sufficiently so that it operates as a fulcrum, causing the front portion of the belt tracks to raise off of the ground surface.

11. A multi-point mobility device, capable of providing a plurality of ground surface contact points, as recited in claim 7, in which the means to raise or lower the central wheel of the track belt assembly comprises an axle actuator which is capable a rotating a central axle, which is attached at its distal ends to a respective offset axle assembly, where said offset axle assemblies are each connected to their respective central wheel in a belt track assembly, so that when the axle actuator rotates a central axle, the offset axle is caused to move in an arcual orbital path around the central axle, causing the central wheel of the belt track assembly to move upward or downward.

12. A multi-point mobility device, capable of providing a plurality of ground surface contact points, as recited in claim 7, in which the drive motors are operated independently using a control means.

13. A multi-point mobility device, capable of providing a plurality of ground surface contact points, as recited in claim 7, in which the means to raise and lower the center wheel of the track belt assembly includes a sensor that determines the amount of longitudinal movement of the center wheel, at which is capable of displaying this information to the user of the device.

14. A multi-point mobility device, capable of providing a plurality of ground surface contact points, as recited in claim 7, in which the means to raise and lower the independent rear wheel is capable of lifting the rear portion of the device off of the ground surface, and includes a sensor that determines the amount of longitudinal movement of the rear wheel, and which is capable of displaying this information to the user of the device.

15. A multi-point mobility device, capable of providing a plurality of ground surface contact points, as recited in claim 7, in which the means to raise and lower the independent rear wheel comprises an rear wheel actuator which is capable moving an actuator rod up and down, the relation to the device, were said actuator rod is connected to and causes the rear wheel to move upward and downward.

16. A multi-point mobility device having an independent rear wheel that may be raised or lowered, a pair of track belt assemblies, with each one positioned on either side of a supporting frame, in which each track assembly has a front wheel, a rear wheel and a central wheel, where the central wheel is able to be raised or lowered, and which is able to configure the belt assemblies from a standard configuration, in which the bottom portion of the track belt contiguously contacts a flat ground surface, to a new configuration by raising a portion of the track belt assembly off of the ground surface.

17. A multi-point mobility device, as recited in claim 16, in which the front portion of the track belt assembly is raise off of the ground surface, where the center wheel is lowered independent of the front and rear wheels of the belt track assemblies, so that the center wheel operate as a fulcrum, causing the center of gravity located behind the center wheel to lift up the front end of the belt track.

18. A multi-point mobility device, as recited in claim 16, in which the center wheel is lowered independent of the front and rear wheels of the belt track assemblies, so that the center wheels operate as a fulcrum, and where the front end of the belt track assembly is lifted off of the ground surface, and where a rear wheel is lowered, causing the back end of the belt track assembly to be also lifted off of the ground surface, so that the multi-point mobility device contacts the ground surface only at the contact made by the independent rear wheel, and the track belt beneath the center wheel.

19. A multi-point mobility device, as recited in claim 16, in which the bottom of the front wheel, center wheel and rear drive wheel occupy the same level plane, but where the independent rear wheel is lowered, causing the back end of the belt track assembly to be lifted off of the ground surface, raising the rear portion of the belt track assembly off of the ground surface, so that the multi-point mobility device contacts the ground surface only at the contact made by the independent rear wheel, and the front portion of the track belt beneath the front wheel of the belt track assembly.

* * * * *